(12) United States Patent
Reiter et al.

(10) Patent No.: US 8,062,405 B1
(45) Date of Patent: Nov. 22, 2011

(54) VALUE-ADDED GRANULATED ORGANIC FERTILIZER AND PROCESS FOR PRODUCING THE SAME

(75) Inventors: Mark Stephen Reiter, Marionville, VA (US); Tommy C. Daniel, Fayetteville, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 281 days.

(21) Appl. No.: 12/503,185

(22) Filed: Jul. 15, 2009

Related U.S. Application Data

(60) Provisional application No. 61/080,895, filed on Jul. 15, 2008.

(51) Int. Cl.
| | |
|---|---|
| *C05D 9/02* | (2006.01) |
| *C05F 11/00* | (2006.01) |
| *C05F 3/00* | (2006.01) |
| *C05F 1/00* | (2006.01) |
| *C05B 17/00* | (2006.01) |
| *A01N 25/00* | (2006.01) |

(52) U.S. Cl. ............. 71/21; 71/11; 71/12; 71/15; 71/18; 71/20; 71/64.02; 71/64.03

(58) Field of Classification Search ................ 71/11–15, 71/18–22, 64.01, 64.02, 64.03, 64.04, 64.05
See application file for complete search history.

(56) References Cited

U.S. PATENT DOCUMENTS

| | | | | |
|---|---|---|---|---|
| H1070 H | * | 7/1992 | Harrison et al. ............ | 23/313 R |
| 5,730,772 A | * | 3/1998 | Staples ............................... | 71/9 |
| 6,174,472 B1 | | 1/2001 | Johnson et al. | |
| 6,464,746 B2 | | 10/2002 | Neyman et al. | |
| 6,852,142 B2 | | 2/2005 | Varshovi | |
| 6,860,236 B2 | | 3/2005 | Wood | |

OTHER PUBLICATIONS

Reiter, M.S. 2008. Environmental and agronomic evaluation of value-added nitrogen fortified poultry litter and biosolids fertilizers. Ph.D. diss. Univ. of Arkansas, Fayetteville.

Reiter, M.S., T.C. Daniel, and M. Mozaffari. 2008. Seed cotton yield from application of nitrogen-fortified poultry litter granular fertilizers. In press. Arkansas Cotton Res. Series. Arkansas Agric. Expt. Stn., Univ. of Arkansas, Fayetteville.

(Continued)

*Primary Examiner* — Stanley Silverman
*Assistant Examiner* — Jennifer Smith
(74) *Attorney, Agent, or Firm* — Head, Johnson & Kachigian, PC

(57) ABSTRACT

A value-added granulated organic fertilizer produced from poultry litter and biosolids using agglomeration techniques with a pin mixer. The granulated organic fertilizer includes granules biosolids, a nitrification inhibitor, such as dicyandiamide, and a binding agent, such as lignosulfonate, urea formaldehyde, or water. The nitrogen concentration of the granulated organic fertilizer is increased by being fortified with urea. The poultry litter and biosolids formulated into the granulated organic fertilizer aid in flowability, storage, and spreading, while value-added plant nutrient ingredients provide an environmentally safer fertilizer than fresh poultry litter, municipal biosolids and/or many commercially available products commonly used in urban and agricultural systems. The binding agents change the fertilizer granule water soluble phosphorus and nitrogen concentrations and reduce fines and dust. The nitrification inhibitor reduces nitrogen losses via leaching and denitrification, while biosolids decrease water soluble and total phosphorus concentrations in runoff water for environmental protection.

34 Claims, 23 Drawing Sheets

OTHER PUBLICATIONS

Reiter, M.S., T.C. Daniel, R.G. Hinkle, and M.D. Richardson. 2008. Runoff water quality from turfgrass applications of nitrogen fortified poultry litter and biosolids fertilizers using simulated rainfall. Res. Ser. 525. In Press. In N.A. Slaton. (ed.) Wayne E. Sabbe Arkansas Soil Fertility Studies 2007. Arkansas Agric. Expt. Stn., Univ. of Arkansas, Fayetteville.

Reiter, M.S., T.C. Daniel, N.A. Slaton, and R.J. Norman. 2008. Rice yield and nitrogen recovery from nitrogen-fortified poultry litter granular fertilizers. Res. Ser. 525. In Press. In N.A. Slaton. (ed.) Wayne E. Sabbe Arkansas Soil Fertility Studies 2007. Arkansas Agric. Expt. Stn., Univ. of Arkansas, Fayetteville.

AgriRecycle. 2007. A manure management company for the 21st century [Online]. Available at http://www.agrirecycle.com/ (accessed Jul. 13, 2007; verified Jul. 16, 2007). AgriRecycle. Bolivar, Missouri.

Bitzer, C.C., and J.T. Sims. 1988. Estimating the availability of nitrogen in poultry manure through laboratory and field studies. J. Environ. Qual. 17(1):47-54.

Hamilton, C.M., and J.T. Sims. 1995. Nitrogen and phosphorus availability in enriched, pelletized poultry litters. J. Sustainable Agric. 5(3):115-132.

Hinkle, R.G., and R. Rosenthal. 1991. "Of beer, leather, and beets." A study of alternative binders in agitation pelletizing. Proc. 22nd Inst. Briquetting and Agglomeration, Biennial Conf. 22:131-142. (Available online at http://www.marsmineral.com/library/AlternativeBinders.doc) (accessed Jul. 2, 2004; verified Jul. 16, 2007). Mars Mineral Inc. Mars, Pennsylvania.

McMullen, J., O.O. Fasina, C.W. Wood, and Y. Feng. 2005. Storage and handling characteristics of pellets from poultry litter. Applied Engineering Agric. 21(4):645-651.

Milorganite. 2007. Milorganite lawn and garden products [Online]. Available at http://www.milorganite.com/home/ (accessed Jul. 13, 2007; verified Jul. 16, 2007). Milorganite. Milwaukee, Wisconsin.

Tabil, L.G., Jr., S. Sokhansanj and R.T. Tyler. 1997. Performance of different binders during alfalfa pelletizing. Can. Agric. Eng. 39(1):17-23.

Veverka, J. and R. Hinkle. 2001. A comparison of liquid binders for limestone pelletizing [Online]. Proc. 27th Inst. Briquetting and Agglomeration, Biennial Conf., Providence, RI. Available at http://www.pelletizedlimestone.com/library/liquid-binders.pdf (Accessed Jul. 13, 2007; Verified Jul. 16, 2007). Mars Mineral, Inc. Mars, Pennsylvania.

Wolfe, K., C. Ferland, and J. McKissick. 2002. The feasibility of operating a poultry litter pelletizing facility in south Georgia. FR-02-08. Center Agribusiness & Economic Dev., Univ. of GA; Athens.

Reiter, M.S. 2008. Environmental and Agronomic Evaluation of Nitrogen fortified biosolids and poultry litter fertilizers. Apr. 24 Job Research Seminar, Univ. of Wisconsin, Madison.

Reiter, M.S. 2008. Nutrient and soil management specialist. Feb. 19 and 20 Job Research Seminar, Virginia Polytechnic Institute and State Univ., Blacksburg.

Reiter, M.S. 2008. Extension grain crops/precision agriculture specialist. Feb. 11 Job Research Seminar, Auburn University, Auburn.

Reiter, M.S., T.C. Daniel, R.G. Hinkle, N.A. Slaton, and R.J. Norman. 2008. Binding agents affect on physical and chemical attributes of nitrogen fortified poultry litter and biosolids granules. In Annual Meetings Abstracts [CD-ROM]. Oct. 5 ASA, CSSA, and SSSA, Madison, WI.

Reiter, M.S., T.C. Daniel, M.D. Richardson, R.G. Hinkle, N.A. Slaton, and R.J. Norman. 2007. Influence of binding agents on inorganic nitrogen and phosphorus release from a nitrogen fortified poultry litter and biosolids granulated fertilizer during rainfall simulations. In Annual Meetings Abstracts [CD-ROM]. Nov. 7 ASA, CSSA, and SSSSA, Madison, WI.

Reiter, M.S., T.C. Daniel, R.G. Hinkle, N.A. Slaton, and R.J. Norman. 2006. Impact of binding agent and dicyandiamide on nitrogen-fortified granulated poultry litter and biosolid fertilizers. In Annual Meetings Abstracts [CD-ROM]. Nov. 14 ASA, CSSA, and SSSA, Madison, WI.

Reiter, M.S., T.C. Daniel, N.A. Slaton, and R.J. Norman. 2006. Rice response to a nitrogen fortified granular poultry litter fertilizer. In 37th Rice Tech. Working Group Meeting Abstracts. Feb. 26-Mar. 1, 2006. The Woodlands, TX.

Reiter, M.S., T.C. Daniel, N.A. Slaton, and R.J. Norman. 2005. Row crop yield response to a granular nitrogen fortified broiler litter fertilizer on silt loam soils in Arkansas. In Annual Meetings Abstracts [CD-ROM]. Nov. 9 ASA, CSSA, and SSSA, Madison, WI.

Reiter, M.S. 2007, Agronomic and Environmental Evaluation of Nitrogen Fortified Poultry Litter and Biosolids Fertilizers, Nov. 26 Crop, Soil, and Environ. Sci. Dept. Seminar Ser., Univ. of Arkansas, Fayetteville.

* cited by examiner

|  | Dry Ingredient | | | | Binding Agent | | |
|---|---|---|---|---|---|---|---|
| Product - Binder | Biosolids | DCD† | Poultry Litter | Urea | LS‡ | UF | W |
| | | | ------kg t$^{-1}$------ | | | | |
| PLU§ – LS | 0 | 0 | 750 | 250 | 12 | 0 | 27 |
| PLUDCD - LS | 0 | 23 | 757 | 220 | 12 | 0 | 27 |
| PLUB - LS | 312 | 0 | 448 | 240 | 12 | 0 | 27 |
| PLUBDCD - LS | 318 | 23 | 456 | 204 | 12 | 0 | 27 |
| PLU - UF | 0 | 0 | 750 | 250 | 0 | 12 | 27 |
| PLUDCD - UF | 0 | 23 | 757 | 220 | 0 | 12 | 27 |
| PLUB - UF | 312 | 0 | 448 | 240 | 0 | 12 | 27 |
| PLUBDCD - UF | 318 | 23 | 456 | 204 | 0 | 12 | 27 |
| PLU - W | 0 | 0 | 750 | 250 | 0 | 0 | 36 |
| PLUDCD - W | 0 | 23 | 757 | 220 | 0 | 0 | 36 |
| PLUB - W | 312 | 0 | 448 | 240 | 0 | 0 | 36 |
| PLUBDCD - W | 318 | 23 | 456 | 204 | 0 | 0 | 36 |

†Dicyandiamide.
‡Lignosulfonate (LS), urea formaldehyde (UF), and water (W).
§Poultry litter + urea (PLU), PLU + dicyandiamide (DCD) (PLUDCD), PLU + biosolids (PLUB), and PLUB + DCD (PLUBDCD).

FIG. 2

|  | Biosolids | | No biosolids | |
| --- | --- | --- | --- | --- |
| Binding agent | DCD | No DCD | DCD | No DCD |
| | Loose bulk density | | | |
| | g fertilizer cm$^{-3}$ | | | |
| Lignosulfonate | 0.55 c† | 0.55 c | 0.48 f | 0.46 g |
| Urea formaldehyde | 0.59 a | 0.54 d | 0.48 f | 0.46 g |
| Water | 0.54 d | 0.56 b | 0.44 h | 0.50 e |
| | Packed bulk density | | | |
| | g fertilizer cm$^{-3}$ | | | |
| Lignosulfonate | 0.60 c | 0.60 c | 0.53 f | 0.51 g |
| Urea formaldehyde | 0.64 a | 0.60 c | 0.53 f | 0.50 h |
| Water | 0.59 d | 0.61 b | 0.48 i | 0.55 e |
| | Percent settling | | | |
| | % | | | |
| Lignosulfonate | 9.55 abc | 10.20 ab | 11.25 a | 10.42 ab |
| Urea formaldehyde | 9.58 abc | 10.31 ab | 11.10 a | 8.60 bc |
| Water | 9.49 abc | 8.07 c | 8.61 bc | 9.38 abc |

†Means followed by the same letter are not significantly different at $p<0.05$ within each interaction.

FIG. 3

|  | Bulk Density | | | | |
| --- | --- | --- | --- | --- | --- |
| Product | Loose† | Packed | Change | Force | Attrition |
|  | --------g cm³-------- | | --%-- | --Nw‡-- | --%-- |
| Biosolids | 0.70 c | 0.76 c | 8.6 a | --- | --- |
| Fresh Litter | 0.37 d | 0.40 d | 8.1 a | --- | --- |
| TSP§ | 1.09 a | 1.15 a | 5.7 b | 260 a | 0.02 a |
| Urea | 0.76 b | 0.81 b | 5.9 b | 238 a | 0.01 a |

†Means with different letters can be separated with Fisher's protected LSD at the 0.05 significance level within each column.
‡Newton.
§Triple super phosphate.

FIG. 4

|  | Biosolids | | No biosolids | |
| --- | --- | --- | --- | --- |
| Binding agent | DCD | No DCD | DCD | No DCD |
|  | ----------------------------------%---------------------------------- | | | |
| Lignosulfonate | 1.51 b† | 1.88 b | 1.25 bc | 1.07 bc |
| Urea formaldehyde | 0.94 bc | 1.21 bc | 1.80 b | 0.34 c |
| Water | 0.54 c | 1.61 b | 1.70 b | 3.68 a |

†Means followed by the same letter are not significantly different at $p<0.05$.

FIG. 5

| Binding agent | Biosolids | No biosolids |
|---|---|---|
| | ---------------------------------Nw† --------------------------------- | |
| Lignosulfonate | 383 a | 402 a |
| Urea formaldehyde | 396 a | 390 a |
| Water | 406 a | 336 b |

†Newton.
‡Means followed by the same letter are not significantly different at $p<0.05$.

FIG. 6

| | Biosolids | No biosolids |
|---|---|---|
| | ---------------------------------%‡ --------------------------------- | |
| Lignosulfonate | 7.36 d† | 15.34 b |
| Urea formaldehyde | 6.38 e | 15.40 b |
| Water | 8.05 c | 19.71 a |

†Means followed by the same letter are not significantly different at $p<0.10$ within each interaction.
‡Total P as DRP = water extractable DRP/total granule P*100.

FIG. 7

| Binding agent | Biosolids | No biosolids |
|---|---|---|
| | ----------%†---------- | |
| Lignosulfonate | -45 b‡ | -48 bc |
| Urea formaldehyde | -74 d | -57 c |
| Water | -28 a | -52 bc |

†Water extractable $NH_4$-N released as percentage of calculated nutrient = (water extractable $NH_4$-N − calculated dry ingredient $NH_4$-N)/calculated $NH_4$-N*100.
‡Means followed by the same letter are not significantly different at $p<0.05$ within each interaction.

FIG. 8

| | Biosolids | | No biosolids | |
|---|---|---|---|---|
| Binding agent | DCD | No DCD | DCD | No DCD |
| | ----------%†---------- | | | |
| Lignosulfonate | 143 c‡ | 158 d | 203 b | 129 f |
| Urea formaldehyde | 106 g | 128 f | 204 b | 130 f |
| Water | 179 c | 170 c | 278 a | 206 b |

†Water extractable DRP released as percentage of calculated nutrient = (water extractable DRP − calculated dry ingredient DRP)/calculated DRP*100.
‡Means followed by the same letter are not significantly different at $p<0.05$ within each interaction.

FIG. 9

|                                | Year          |              |               |
|--------------------------------|---------------|--------------|---------------|
| Management Event               | 2004          | 2005         | 2006          |
| Applied PL fertilizers         | May 20        | April 18     | May 15        |
| Planted rice                   | May 21        | April 18     | May 15        |
| Applied pre-flood urea         | June 28       | June 6       | June 13       |
| Established permanent flood    | June 30       | June 7       | June 14       |
| Early heading samples collected| August 3      | July 26      | August 8      |
| Drained permanent flood        | September 17  | August 26    | September 12  |
| Harvested rice                 | September 28  | September 8  | September 25  |

FIG. 14

| N Source | Equation† | $R^2$ | N FRE‡ | Urea basis§ |
|---|---|---|---|---|
| | | | \-\-\-\-\-\-\-\-\-\-\-\-\-\-\-\-%\-\-\-\-\-\-\-\-\-\-\-\-\-\-\-\- | |
| | | 2004 | | |
| Poultry litter | 68.4 + 0.22N | 0.32 | 22 | 38 |
| PLU¶ | 73.2 + 0.46N | 0.51 | 46 | 79 |
| PLUDCD¶ | 70.3 + 0.48N | 0.60 | 48 | 83 |
| Preflood urea | 64.4 + 0.58N | 0.68 | 58 | 100 |
| Standard error | | | 12 | 21 |
| | | 2005 | | |
| Poultry litter | 35.4 + 0.16N | 0.71 | 16 | 20 |
| PLU | 34.1 + 0.21N | 0.60 | 21 | 27 |
| PLUDCD | 23.7 + 0.56N | 0.68 | 56 | 71 |
| Preflood urea | 28.3 + 0.79N | 0.85 | 79 | 100 |
| Standard error | | | 9 | 11 |
| | | 2006 | | |
| Poultry litter | 46.4 + 0.17N | 0.29 | 17 | 17 |
| PLU | 44.9 + 0.25N | 0.38 | 25 | 26 |
| PLUDCD | 53.6 + 0.49N | 0.35 | 49 | 50 |
| Preflood urea | 39.5 + 0.98N | 0.83 | 98 | 100 |
| Standard error | | | 15 | 15 |

†Highest order model (linear or quadratic) that was significant presented.
‡N fertilizer recovery efficiency (FRE) = linear slope coefficient*100.
§Urea basis = N Source FRE/urea N FRE*100.
¶Poultry litter + urea (PLU) and PLU + DCD (PLUDCD).

FIG. 16

| N Source | Yield response† | $R^2$ | Urea N rate‡ | Predicted Yield | Predicted yield confidence interval | Agronomic efficiency§ | Urea basis¶ |
|---|---|---|---|---|---|---|---|
| | | | -kg N ha$^{-1}$- | ---kg rice ha$^{-1}$--- | | -kg rice kg N$^{-1}$- | ---%--- |
| 2004 | | | | | | | |
| Poultry litter | $4718 + 12.4N$ | 0.82 | 90 | 5834 | 5674 – 5988 | 12.4 | 71 |
| PLU†† | $4727 + 22.1N - 0.051N^2$ | 0.84 | 90 | 6303 | 6093 – 6520 | 17.5 | 100 |
| PLUDCD†† | $4705 + 24.4N\ 0.054N^2$ | 0.94 | 90 | 6464 | 6248   6674 | 19.5 | 111 |
| Preflood urea | $4700 + 26.2N - 0.097N^2$ | 0.76 | 90 | 6272 | 6067 – 6481 | 17.5 | 100 |
| 2005 | | | | | | | |
| Poultry litter | $2888 + 14.7N$ | 0.52 | 152 | 5122 | 4738 – 5507 | 14.7 | 28 |
| PLU | $2785 + 18.4N$ | 0.82 | 152 | 5582 | 5201   5970 | 18.4 | 34 |
| PLUDCD | $2791 + 27.6N$ | 0.89 | 152 | 6986 | 6591 – 7374 | 27.6 | 52 |
| Preflood urea | $2685 + 84.3N - 0.203N^2$ | 0.95 | 152 | 10809 | 10427 – 11177 | 53.4 | 100 |
| 2006 | | | | | | | |
| Poultry litter | $3672 + 12.2N$ | 0.56 | 117 | 5099 | 4775   5416 | 12.2 | 29 |
| PLU | $3562 + 16.0N$ | 0.64 | 117 | 5434 | 5113 – 5754 | 16.0 | 39 |
| PLUDCD | $3624 + 40.2N - 0.092N^2$ | 0.81 | 117 | 7068 | 6628 – 7514 | 29.4 | 71 |
| Preflood urea | $3596 + 65.5N\ 0.206N^2$ | 0.94 | 117 | 8440 | 8019   8861 | 41.4 | 100 |

†Highest order model (quadratic or linear) that was significant presented.
‡Nitrogen rate required for highest yield in preflood urea treatments.
§Nitrogen agronomic efficiency = (predicted yield – y-intercept)/urea N rate.
¶Urea basis = Source N agronomic efficiency/urea N agronomic efficiency*100.
††Poultry litter + urea (PLU) and PLU + DCD (PLUDCD).

FIG. 18

| N Source | H$_2$O† | N | C | P | K | NO$_3$-N | NH$_4$-N |
|---|---|---|---|---|---|---|---|
| | ------------------------g kg$^{-1}$------------------------ | | | | | ------mg kg$^{-1}$------ | |
| | | | | 2004 | | | |
| Poultry litter | 234 | 47.6 | 362.9 | 20.8 | 34.3 | 203 | 3775 |
| PLU‡ | 155 | 159.9 | 404.3 | 16.9 | 27.6 | 2165 | 6184 |
| PLUDCD‡ | 155 | 146.2 | 405.8 | 16.1 | 29.7 | 1912 | 6146 |
| | | | | 2005 | | | |
| Poultry litter | 222 | 41.1 | 322.9 | 21.3 | 39.1 | 400 | 4846 |
| PLU§ | 113 | 171.6 | 356.6 | 18.2 | 31.0 | 177 | 2980 |
| PLUDCD§ | 117 | 179.2 | 347.4 | 16.9 | 31.0 | 137 | 2863 |

†Moisture content "as-is".
‡Poultry litter + urea (PLU) and PLU + dicyandiamide (PLUDCD). Manufactured by Lee Harris Farms, Inc., Bentonville, AR 72712.
§Manufactured by Mars Mineral, Inc., Mars, PA 16046.

FIG. 19

|                          | Year         |              |
|--------------------------|--------------|--------------|
| Management Event         | 2004         | 2005         |
| Applied PL fertilizers   | May 20       | May 11       |
| Incorporated fertilizers | May 22       | May 11       |
| Planted cotton           | May 22       | May 4        |
| Applied second urea split| June 27      | June 6       |
| Defoliant applied        | October 4    | September 23 |
| Harvested cotton         | October 22   | October 5    |

FIG. 20

| N Source | Yield response† | $R^2$ | Split Urea N rate‡ | Predicted Yield | Predicted yield confidence interval | Agronomic efficiency§ | Split Urea basis¶ |
|---|---|---|---|---|---|---|---|
| | | | -kg N ha$^{-1}$- | ----kg ha$^{-1}$---- | | --kg kg N$^{-1}$-- | ---%--- |
| | | | | 2004 | | | |
| Poultry litter | NS††; mean = 3372 | NS | 91 | 3372 | 3288-3473 | 0.0 | 0 |
| PLU‡‡ | NS; mean = 3249 | NS | 91 | 3249 | 3157-3342 | 0.0 | 0 |
| PLUDCD‡‡ | 3109 + 7.6N | 0.97 | 91 | 3801 | 3709-3894 | 7.6 | 138 |
| At-planting urea | 3257 + 4.9N | 0.84 | 91 | 3703 | 3609-3795 | 4.9 | 89 |
| Split urea§§ | 3288 + 5.5N | 0.68 | 91 | 3789 | 3700-3886 | 5.5 | 100 |
| | | | | 2005 | | | |
| Poultry litter | $2816 + 15.9N - 0.058N^2$ | 0.45 | 70 | 3645 | 3473-3819 | 11.8 | 61 |
| PLU | $2738 + 22.0N - 0.071N^2$ | 0.84 | 70 | 3930 | 3760-4108 | 17.0 | 87 |
| PLUDCD | $2806 + 22.0N - 0.074N^2$ | 0.72 | 70 | 3983 | 3820-4158 | 16.8 | 86 |
| At-planting urea | $2736 + 24.6N\ 0.090N^2$ | 0.87 | 70 | 4017 | 3840-4188 | 19.3 | 94 |
| Split urea | $2638 + 26.1N - 0.094N^2$ | 0.76 | 70 | 4004 | 3831-4178 | 19.5 | 100 |

†Highest order model (quadratic or linear) that was significant presented.
‡Nitrogen rate required for 90% yield in split urea treatments.
§Nitrogen agronomic efficiency = (predicted yield – y-intercept)/split urea N rate.
¶Split urea basis = Source N agronomic efficiency/split urea N agronomic efficiency*100.
††No significant relationship found. Treatment means are presented in kg seed cotton ha$^{-1}$.
‡‡Poultry litter + urea (PLU) and PLU + DCD (PLUDCD).
§§Urea applications split between 50% at-planting and 50% first match head square formation.

FIG. 21

| Formulation - binder | NH$_4$-N | NO$_3$-N | Organic N | Total N | Dissolved reactive P | Total solids |
|---|---|---|---|---|---|---|
| | ------------------------------------------------lb/acre------------------------------------------------ | | | | | |
| Soil background† | 87.8 | 3.8 | 3379 | 3471 | 32.1 | 1831100‡ |
| PLU – LS§ | 4.0 | 0.3 | 196 | 201 | 2.1 | 1094 |
| PLUDCD – LS | 3.3 | 0.2 | 196 | 199 | 2.8 | 1078 |
| PLUB – LS | 2.6 | 0.2 | 181 | 183 | 1.6 | 1105 |
| PLUBDCD – LS | 2.7 | 0.2 | 184 | 187 | 1.5 | 1143 |
| PLU – UF | 4.5 | 0.2 | 209 | 214 | 2.2 | 1123 |
| PLUDCD – UF | 3.7 | 0.3 | 225 | 229 | 3.2 | 1241 |
| PLUB – UF | 1.6 | 0.1 | 205 | 206 | 1.4 | 1178 |
| PLUBDCD – UF | 2.3 | 0.2 | 202 | 204 | 1.3 | 1252 |
| PLU – W | 3.6 | 0.2 | 172 | 176 | 2.8 | 1078 |
| PLUDCD – W | 2.8 | 0.2 | 183 | 186 | 3.6 | 1086 |
| PLUB – W | 3.0 | 0.2 | 173 | 176 | 1.6 | 1070 |
| PLUBDCD – W | 2.7 | 0.2 | 172 | 174 | 1.7 | 1057 |
| Biosolids | 0.4 | 0.0 | 19 | 20 | 0.1 | 626 |
| Milorganite | 1.3 | 0.0 | 62 | 63 | 0.1 | 929 |
| No-fertilizer control | 0.0 | 0.0 | 0 | 0 | 0.0 | 0 |
| Poultry litter | 5.9 | 0.2 | 36 | 42 | 0.5 | 879 |
| Urea + TSP | 0.2 | 0.0 | 218 | 218 | 17.8 | 942 |

†pH = 6.6, electrical conductivity (1:2, soil:water ratio) = 176 µS cm$^{-1}$, Mehlich-3 P = 247 lb P/acre, and total P = 1053 lb P/acre.
‡For 4 inch deep furrow slice calculated from bulk density.
§Poultry litter + urea (PLU), PLU + dicyandiamide (DCD) (PLUDCD), PLU + biosolids (PLUB), PLUB + DCD (PLUBDCD), lignosulfonate (LS), urea formaldehyde (UF), water (W), and triple super phosphate (TSP).

FIG. 22

| Formulation - Binder | Concentration | | Load | | DRP fraction of TP load | Applied TP Lost |
| --- | --- | --- | --- | --- | --- | --- |
| | DRP | TP | DRP | TP | | |
| | --------mg $L^{-1}$------- | | ------kg $ha^{-1}$------ | | ----------------%---------------- | |
| PLU – LS† | 3.0 bc‡ | 15.0 b | 0.7 a | 3.4 b | 20.5 hi | 16.9 b |
| PLUDCD – LS | 2.9 bcde | 10.5 d | 0.7 a | 2.5 cd | 27.4 fgh | 12.4 cd |
| PLUB – LS | 2.6 fg | 5.5 gh | 0.4 a | 0.8 hij | 46.7 b | 3.8 hi |
| PLUBDCD – LS | 2.4 gh | 5.9 g | 0.5 a | 1.1 ghij | 40.9 bc | 5.5 ghi |
| PLU – UF | 2.7 def | 12.8 c | 0.7 a | 3.1 bc | 21.7 ghi | 15.5 bc |
| PLUDCD – UF | 3.1 b | 11.4 cd | 0.6 a | 2.1 def | 27.6 fgh | 10.4 def |
| PLUB – UF | 2.6 efg | 6.4 fg | 0.5 a | 1.3 ghi | 41.1 bc | 6.2 gh |
| PLUBDCD – UF | 2.7 cdef | 7.4 fg | 0.6 a | 1.7 efg | 37.0 cde | 8.5 efg |
| PLU – W | 3.1 b | 9.8 de | 0.5 a | 1.7 efg | 31.3 def | 8.3 efg |
| PLUDCD – W | 2.9 bcd | 10.8 d | 0.6 a | 2.4 cde | 27.3 fgh | 11.9 cde |
| PLUB – W | 2.9 bcd | 8.3 ef | 0.5 a | 1.5 fgh | 36.2 cdef | 7.4 fgh |
| PLUBDCD – W | 2.7 cdef | 6.8 fg | 0.7 a | 1.6 fg | 40.1 bcd | 8.1 fg |
| Biosolids | 1.8 j | 2.7 i | 0.3 a | 0.5 j | 67.2 a | 2.4 ij |
| No-fertilizer | 2.1 ij | 3.5 i | 0.4 a | 0.7 ij | 63.4 a | 0.0 j |
| Milorganite | 2.3 hi | 3.7 hi | 0.5 a | 0.8 hij | 62.2 a | 4.0 hi |
| Poultry Litter | 3.0 bcd | 9.7 de | 0.6 a | 2.1 def | 30.7 efg | 10.4 def |
| Urea + TSP | 4.2 a | 28.8 a | 0.7 a | 4.9 a | 14.6 i | 24.7 a |

†Poultry litter + urea (PLU), PLU + dicyandiamide (DCD) (PLUDCD), PLU + biosolids (PLUB), PLUB + DCD (PLUBDCD), lignosulfonate (LS), urea formaldehyde (UF), water (W), and triple super phosphate (TSP).

‡Means followed by the same letter are not significantly different at $p<0.10$ within each column.

FIG. 23

|  | Biosolids | | No biosolids | |
|---|---|---|---|---|
| Binding agent | DCD | No DCD | DCD | No DCD |
| | Applied TP lost | | | |
| | ------%------ | | | |
| Lignosulfonate | 5.5 ef† | 3.8 f | 12.4 bc | 16.9 a |
| Urea formaldehyde | 8.5 de | 6.2 ef | 10.4 cd | 15.5 ab |
| Water | 8.1 de | 9.1 cde | 11.9 bcd | 8.3 de |
| | TP runoff water load | | | |
| | ------kg ha$^{-1}$------ | | | |
| Lignosulfonate | 1.1 ef | 0.8 f | 2.5 bc | 3.4 a |
| Urea formaldehyde | 1.7 dc | 1.3 ef | 2.1 cd | 3.1 ab |
| Water | 1.6 de | 1.8 cde | 2.4 bcd | 1.7 de |
| | TP runoff water concentration | | | |
| | ------mg L$^{-1}$------ | | | |
| Lignosulfonate | 5.9 fg | 5.5 g | 10.5 c | 15.0 a |
| Urea formaldehyde | 7.4 ef | 6.4 fg | 11.4 bc | 12.8 b |
| Water | 6.8 efg | 8.3 de | 10.8 c | 9.8 cd |

†Means followed by the same letter are not significantly different at $p<0.10$ within each interaction.

FIG. 24

|  | Percent applied lost† | Percent fraction of TN load‡ | | |
| --- | --- | --- | --- | --- |
| Formulation - binder | TN | NH$_4$-N | NO$_3$-N | Organic N |
|  | ---------------------------------------------%--------------------------------------------- | | | |
| PLU – LS§ | 4.4 cdef¶ | 43.0 bcd | 0.1 b | 56.9 bcd |
| PLUDCD – LS | 5.6 abcd | 29.8 defg | 0.1 b | 70.1 ab |
| PLUB – LS | 3.3 defg | 29.7 defg | 0.2 b | 70.1 ab |
| PLUBDCD – LS | 5.9 abc | 20.6 efg | 0.1 b | 79.3 a |
| PLU – UF | 3.4 defg | 51.8 ab | 0.1 b | 48.1 de |
| PLUDCD – UF | 2.7 fg | 49.0 abc | 0.1 b | 50.9 cde |
| PLUB – UF | 3.7 cdefg | 37.9 bcde | 0.4 b | 61.7 bcd |
| PLUBDCD – UF | 4.6 cdef | 33.3 cdef | 0.1 b | 66.6 abc |
| PLU – W | 3.8 cdef | 41.8 bcd | 0.1 b | 58.1 bcd |
| PLUDCD – W | 5.2 bcde | 43.8 bcd | 0.1 b | 56.1 bcd |
| PLUB W | 4.2 cdef | 40.1 bcd | 0.1 b | 59.8 bcd |
| PLUBDCD – W | 7.6 a | 18.1 fg | 0.1 b | 81.8 a |
| Biosolids | 1.4 gh | 61.0 a | 1.8 a | 37.2 e |
| Milorganite | 3.2 efg | 42.0 bcd | 0.1 b | 57.9 bcd |
| No-fertilizer control | 0.0 h | 15.5 g | 2.3 a | 82.2 a |
| Poultry litter | 7.3 ab | 46.7 abcd | 0.2 b | 53.1 bcde |
| Urea + TSP | 3.9 cdef | 31.6 cdefg | 0.1 b | 68.3 abc |

†Percent lost of amount applied = TN load/TN applied * 100.
‡Percent of TN load = NH$_4$-N load/TN load * 100; substitute NO$_3$-N and organic N when appropriate.
§Poultry litter + urea (PLU), PLU + dicyandiamide (DCD) (PLUDCD), PLU + biosolids (PLUB), PLUB + DCD (PLUBDCD), lignosulfonate (LS), urea formaldehyde (UF), water (W), and triple super phosphate (TSP).
¶Means followed by the same letter are not significantly different at $p<0.10$ within each column.

FIG. 25

| Dissolved solids as a percentage of total solid's load | Total solids lost |
|---|---|
| ------------------------------% ------------------------------ ||
| 66.7 b† | 9.5 b |
| 82.3 a | 13.6 a |

†Means followed by the same letter are not significantly different at $p<0.10$ within each column.

FIG. 26

VALUE-ADDED GRANULATED ORGANIC FERTILIZER AND PROCESS FOR PRODUCING THE SAME

CROSS-REFERENCE TO RELATED APPLICATIONS

This application claims priority to U.S. Provisional Application Ser. No. 61/080,895, filed Jul. 15, 2008, which is incorporated herein by reference.

BACKGROUND OF THE INVENTION

1. Field of the Invention

This invention relates generally to a value-added granulated organic fertilizer and process for producing the same from fresh poultry litter and municipal biosolids, and more particularly to a value-added granulated organic fertilizer and process for producing the same from fresh poultry litter and municipal biosolids having an increased rate of production and a decreased cost of production and which allows specific binding agents to be agglomerated for ease in handling, storage and application, and which allows value-added materials to be easily incorporated to change the structural and nutrient release characteristics of the granulated organic fertilizer that impact plant nutrient uptake and reduce environmental nutrient loss.

2. Description of the Related Art

Approximately nine (9) billion broilers in the United States produce 13.9 million tons of poultry litter ("PL") as a waste product annually. Similarly, over 59.5 million tons of wet biosolids ("BS") are produced daily in the United States. Land application is restricted due to the perceived risk of phosphorus ("P") loss, and potential liability and disposal is a huge expense to taxpayers. Over-application of PL and runoff water and BS increases total phosphorus ("TP") and dissolved reactive P ("DRP") concentrations in runoff water. DRP is considered one of the predominant, non-point source pollutants in freshwater systems resulting in algal bloom, low dissolved oxygen in the water, fish kill and generally undesirable water conditions.

Given some modification, environmentally stable PL and BS can be excellent fertilizer sources useful on row crop production areas that traditionally operate on P and nitrogen ("N") deficient soils. Studies also show restorative qualities of using PL on precision leveled soils and found positive influences on soil properties, such as bulk density. The urban market awaits the development of a PL and BS formulation that meets its needs.

Fresh PL and BS are bulky, smelly, have low nutrient concentrations, have irregular shapes, and require special equipment for fertilizer application. Pelletizing PL and BS is a common industrial practice to change products into a desirable end-form, but cost of production and end-user acceptance limit its commercial use. However, granulation of PL and BS represents an opportunity to enhance the commercial acceptance of the products.

It is therefore desirable to provide a value-added granulated organic fertilizer produced by a granulation process that is faster and cheaper than traditional PL pelletizing techniques and results in a N-fortified PL and BS granular fertilizer.

It is also desirable to provide a value-added granulated organic fertilizer that creates a valuable commercial alternative for two (2) waste products, addresses concerns over ever increasing fertilizer prices, and addresses public concerns associated with nutrient loading via runoff into freshwater systems.

It is further desirable to provide a value-added granulated organic fertilizer and process of producing the same that provide significant costs savings by the use of nutrients from PL and BS in contrast to traditional inorganic counterparts, with such savings being furthered by that fact that most municipalities will give away BS for free or even pay one to take them.

It is still further desirable to provide a process of producing a value-added granulated organic fertilizer that significantly increases bulk density of fresh PL, thus making the granulated organic fertilizer more economical to transport, store, and apply, along with reducing fines (dust) and odor associated with PL and BS.

It is yet further desirable to provide a value-added granulated organic fertilizer produced by a granulation process that increases water soluble P over fresh PL, thereby making more P readily available to the plant.

It is yet further desirable to provide a value-added granulated organic fertilizer and process of producing the same having overall P runoff water loads that are less than commercial fertilizers (triple superphosphate) that have higher water soluble P.

It is yet further desirable to provide a value-added granulated organic fertilizer and process of producing the same having additions of BS reduce readily soluble P due to metal salts added during the wastewater treatment process, thereby protecting water quality.

It is yet further desirable to provide a granulated organic fertilizer and process of producing the same with lower soluble P allowing a producer to apply more fertilizer than higher water soluble P sources.

It is yet further desirable to provide a value-added granulated organic fertilizer and process of producing the same that utilizes PL and BS, which have slow mineralizable N and P, and thereby provide a slow release fertilizer source over a growing season.

It is yet further desirable to provide a value-added granulated organic fertilizer and process of producing the same that utilizes granulated PL and BS that offer micronutrient components, such as fortified with iron for lawns.

It is yet further desirable to provide a value-added granulated organic fertilizer and process of producing the same capable of utilizing different binding agents to make the granules stronger so they resist breakdown via friction and force, thus resulting in less dust and fines when the granulated organic fertilizer reaches the end consumer which allows for more even application.

It is yet further desirable to provide a value-added granulated organic fertilizer and process of producing the same that may incorporate DCD reduced nitrification to mitigate concerns of nitrates being leached into groundwater, causing health concerns in humans (such as Blue Baby Syndrome) and cattle, and decreasing fertilizer use efficiency via denitrification.

Other advantages and features will be apparent from the following description and from the claims.

BRIEF SUMMARY OF THE INVENTION

In general, in a first aspect, the invention relates to a process of producing a value-added granulated organic fertilizer. The process includes the steps of forming a dry mixture, granulating the dry mixture in a pin mixer to form a granulated dry mixture, adding a binding agent to the granulated dry mixture to form a bound-granulated product, and drying the bound-granulated product to form the granulated organic fertilizer. The dry mixture is formed of approximately 44% to approximately 75% by weight poultry litter, such as approximately 45.6% by weight poultry litter, approximately 20% to approximately 25% by weight urea, such as approximately 20.4% by weight urea, approximately 0% to approximately 31% by weight biosolids, such as approximately 31.8% by weight biosolids, and approximately 0% to approximately 2.3% by weight dicyandiamide, such as approximately 2.3% by weight dicyandiamide.

In addition, the process may include the steps of grinding the poultry litter, passing the ground poultry litter through an approximately 5.8 mm screen, and mixing the ground poultry litter in a feed mill mixer. Further, the process may include the step of drying the biosolids, such as by heating the biosolids in temperature increments for approximately three hours, grinding the dried biosolids, and passing the dried, ground biosolids through an approximately 1.0 mm screen. The step of heating the biosolids may include the steps of heating the biosolids to a temperature of approximately 343° C., and subsequently lowering the temperature to approximately 227° C. Additionally, the step of forming the dry mixture may also include the step of mixing the dry mixture in a rotary mixer for approximately thirty minutes.

In the process of producing the value-added granulated organic fertilizer, the step of granulating the dry mixture may further include the step of feeding the dry mixture into the pin mixer running at approximately 1400 rotations per minute using a vibrating screw feeder at a rate of approximately 2.09 kg dry mixture per minute. Also, the step of adding the binding agent can comprise the step of forming a liquid binding agent mixture of approximately 69% to approximately 100% by weight water, approximately 0% to approximately 31% by weight lignosulfonate, and approximately 0% to approximately 31% by weight urea formaldehyde, and more particularly forming the liquid binding agent mixture of approximately 69% by weight water and approximately 31% by weight lignosulfonate or approximately 31% by weight urea formaldehyde. The liquid binding agent mixture may be applied to the granulated dry mixture via a spray nozzle set at approximately 0.276 MPa to form the bound-granulated product. Also, the urea formaldehyde may be mixed with a catalyst, such as a sulfuric acid and triethylamine catalyst on a 1:44 weight-to-weight ratio.

The step of drying the bound-granulated product of the process for producing the value-added granulated organic fertilizer can also include drying the bound-granulated product at approximately 191° C. until the average water concentration of the granulated organic fertilizer is approximately 120 g of water per kilogram of the granulated organic fertilizer and/or drying the bound-granulated product at approximately 191° C. for approximately 3.5 hours.

In general, in a second aspect, the invention relates to a value-added granulated organic fertilizer being approximately 44% to approximately 75% by weight poultry litter, approximately 20% to approximately 25% by weight urea, approximately 0% to approximately 31% by weight biosolids, approximately 0% to approximately 2.3% by weight of dicyandiamide, and a binding agent. The granulated organic fertilizer may be formed of differing formulations such as (a) approximately 45.6% by weight of the poultry litter, approximately 20.4% by weight of the urea, approximately 31.8% by weight of the biosolids, approximately 2.3% by weight of the dicyandiamide, and the binding agent; (b) approximately 75.7% by weight of the poultry litter, approximately 22.0% by weight of the urea, approximately 2.3% by weight of the dicyandiamide, and the binding agent; and/or (c) approximately 44.8% by weight of the poultry litter, approximately 24.0% by weight of the urea, approximately 31.2% by weight of the biosolids, and the binding agent. The binding agent may be composed of approximately 69% to approximately 100% by weight water, approximately 0% to approximately 31% by weight lignosulfonate, and approximately 0% to approximately 31% by weight urea formaldehyde, and more particularly, the binding agent may be composed of approximately 69% by weight water and approximately 31% by weight lignosulfonate or approximately 31% by weight urea formaldehyde. The urea formaldehyde can include a catalyst, such as a sulfuric acid and triethylamine catalyst mixed with the urea formaldehyde on a 1:44 weight-to-weight ratio.

Further, the value-added granulated organic fertilizer can also include at least one value-added plant nutrient. Additionally, the granulated organic fertilizer may have a loose bulk density of approximately 0.44 $g/cm^3$ to approximately 0.59 $g/cm^3$, such as approximately 0.55 $g/cm^3$ to approximately 0.59 $g/cm^3$, and a packed bulk density of approximately 0.45 $g/cm^3$ to approximately 0.64 $g/cm^3$, such as approximately 0.60 $g/cm^3$ to approximately 0.64 $g/cm^3$.

In general, in a third aspect, the invention relates to an agglomerated fertilizer having a granulated constituent, a binding agent constituent and a value-added plant nutrient constituent. The granulated constituent includes approximately 45.6% by weight poultry litter, approximately 20.4% by weight urea, approximately 31.8% by weight biosolids, and approximately 2.3% by weight dicyandiamide, while the binding agent constituent includes approximately 69% by weight water and approximately 31% by weight lignosulfonate or approximately 31% by weight urea formaldehyde.

BRIEF DESCRIPTION OF THE DRAWINGS

FIG. 2 is a table illustrating formulation ingredients per 1,000 kg for N-fortified PL and BS granulated organic fertilizers in accordance with illustrative embodiments of the value-added granulated organic fertilizer and process of producing the same disclosed herein;

FIG. 3 is a table illustrating loose and packed bulk density for N-fortified PL and BS granulated organic fertilizers in a BS×DCD×binding agent interaction;

FIG. 4 is a table illustrating a comparison of the physical properties for commercially available fertilizers and the value-added granulated organic fertilizer disclosed herein;

FIG. 5 is a table illustrating attrition evaluation (percent granule fragments to pass 0.85 mm sieve) for N-fortified PL and BS granulated organic fertilizers in a BS×DCD×binding agent interaction;

FIG. 6 is a table illustrating maximum force required to crush granules for N-fortified PL and BS granulated organic fertilizers in a BS×binding agent interaction;

FIG. 7 is a table illustrating total P ("TP") present as dissolved reactive P ("DRP") during a water shake study for N-fortified PL and BS granulated organic fertilizers in a BS×binding agent interaction, averaged over DCD treatments;

FIG. 8 is a table illustrating ammonium-N released as a function of dry ingredient calculated concentrations (prior to granulation) during a water shake study for N-fortified granular PL and BS granulated organic fertilizers in a BS×binding agent interaction, averaged over DCD treatments;

FIG. 9 is a table illustrating DRP released as a function of dry ingredient calculated concentrations (prior to granulation) during a water shake study for N-fortified granular PL and BS granulated organic fertilizers in a BS×DCD×binding agent interaction;

FIG. 14 is a table illustrating the selected dates for rice plot sampling and management at the Rice Research and Extension Center near Stuttgart, Ark.;

FIG. 16 is a table illustrating rice plant N uptake when fertilized with PL, N-fortified PL granulated organic fertilizers with and without DCD, and preflood urea on Dewitt silt loam;

FIG. 18 is a table illustrating rice grain yield N agronomic efficiency from applications of PL, N-fortified PL granulated organic fertilizers with and without DCD, and preflood urea on Dewitt silt loam;

FIG. 19 is a table illustrating selected chemical properties for PL and N-fortified PL with and without DCD used for cotton fertilization on a dry weight basis;

FIG. 20 is a table illustrating the selected dates for cotton management at the Lon Mann Cotton Research Station in Marianna, Ark.;

FIG. 21 is a table illustrating seed cotton yield and N agronomic efficiency from applications of PL, N-fortified PL fertilizers with and without DCD, and urea applied at-planting or split 50-50 between at-planting and first match head square formation on a silt loam soil;

FIG. 22 is a table illustrating soil background and nutrient concentrations applied from N-fortified PL and BS granular fertilizers, commercial fertilizers and organic fertilizers applied at 18 lb P/acre rate on a bermudagrass golf fairway;

FIG. 23 is a table illustrating dissolved reactive DRP and TP runoff water concentrations, loads, the percentage DRP fraction of TP load, and percentage of TP applied lost from N-fortified PL and BS granulated organic fertilizer, commercial fertilizer and organic fertilizer applications on a bermudagrass golf fairway;

FIG. 24 is a table illustrating percentage of applied TP lost, runoff water loads and runoff water concentrations for N-fortified PL and BS granulated organic fertilizers on a bermudagrass golf fairway in a BS×DCD×binding agent interaction;

FIG. 25 is a table illustrating percent of total N ("TN"), inorganic N and organic N lost as a function of the amount applied, and fractions of TN load presented as inorganic and organic N from applications of N-fortified PL and BS granular fertilizers, commercial fertilizers and organic fertilizers on a bermudagrass golf fairway; and FIG. 26 is a table illustrating dissolved solids as a percentage of total solids and percentage of total solids lost from applications of N-fortified PL and BS granulated organic fertilizers on a bermudagrass golf fairway in a BS main effect, averaged over DCD and binding agent treatments.

DETAILED DESCRIPTION OF THE INVENTION

Figure 1:
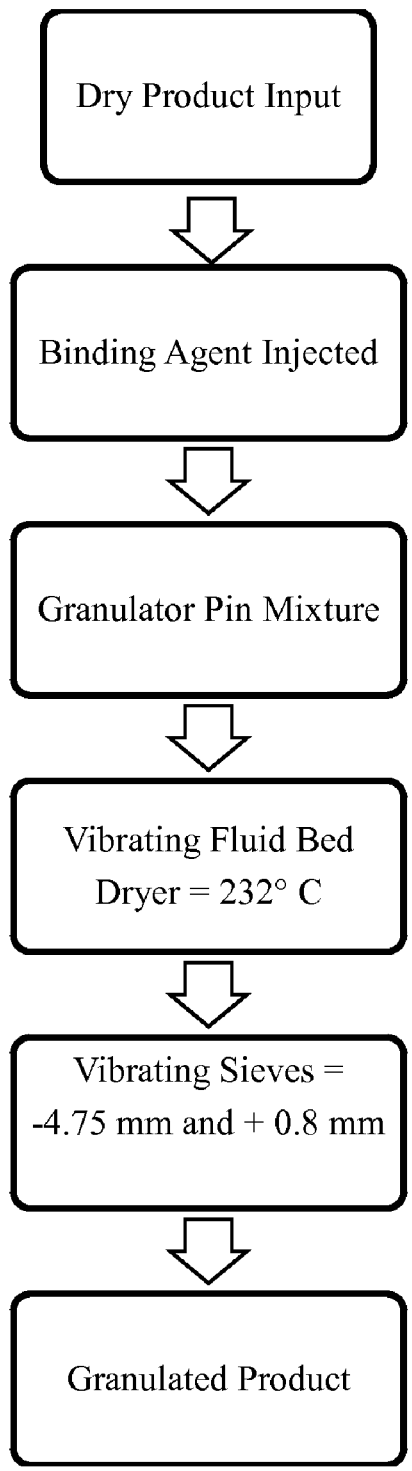
FIG. 1 illustrates an example of a process for producing a value-added granulated organic fertilizer fresh PL and municipal BS using agglomeration.

The compositions and processes discussed herein are merely illustrative of specific manners in which to make and use this invention and are not to be interpreted as limiting in scope.

While the compositions and processes have been described with a certain degree of particularity, it is to be noted that many modifications may be made in the details of the compositions and processes without departing from the spirit and scope of this disclosure. It is understood that the compositions and processes are not limited to the embodiments set forth herein for purposes of exemplification.

A value-added granulated organic fertilizer and process of producing the same from poultry litter, biosolids, a binding agent and value-added plant nutrients to produce small dense spherical particles that look similar to traditional fertilizer sources (~3 mm). The process for producing the value-added granulated organic fertilizer disclosed herein uses centrifugal force and additions of a binding agent to successfully agglomerate the powdery substances for ease in transporting, storage and application. During the granulation process, value-added materials can be easily incorporated to change structural characteristics and nutrient release characteristics that ultimately impact plant nutrient uptake and reduces environmental nutrient loss. The granulated organic fertilizer creates a valuable commercial alternative for two (2) waste products, addresses concerns over ever increasing fertilizer prices and public concerns associated with nutrient loading via runoff into freshwater bodies.

The value-added granulated organic fertilizer disclosed herein is produced using an agglomeration process utilizing a granulator pin mixer that results in granules being approximately three (3) mm in size. The granulated organic fertilizer formulated with PL and BS aid in flowability, storage, spreading, and settling, and value-added ingredients, including not by way of limitation macronutrients (P, N and/or potassium) and/or micronutrients (iron, calcium, magnesium, zinc, copper and/or boron) provide an environmentally safer fertilizer than fresh PL, BS, or many commercially available products commonly used in urban and agricultural systems. The granulated organic fertilizer includes N, such as from urea, added to the formulations of the granulated organic fertilizer during the production process to increase the N concentration, thereby improving fertilizer economics and efficiencies. Nitrification inhibitors (such as DCD) can be incorporated into the granulated organic fertilizer during the production process to reduce N losses via leaching and denitrification. BS additions decrease DRP concentrations in granules, thereby, decreasing water soluble and TP concentration loads in runoff water that can be detrimental to freshwater bodies. A binding agent, such as lignosulfonate, urea formaldehyde or water, can also be added into the granulated organic fertilizer during the production process to increase granule resistance to friction and to increase overall granule strength. The binding agent may be included to change fertilizer granule water soluble P and N concentrations and reduce fines and dust. Overall, the granulation process producing the value-added granulated organic fertilizer disclosed herein changes fresh PL and BS into forms that are suitable for homeowner and agricultural uses, while disposing of expensive waste streams in an environmentally safe manner.

Manufacturing Materials and Methods

PL was collected from the Applied Broiler Research Unit at the University of Arkansas Experiment Station located in Savoy, Ark. The bedding material consisted of 50% rice (*Oryza sativa*) hulls and 50% wood shavings, feces from six (6) flocks of production broilers, and contained no litter treatment additives. Bird diet and environmental conditions were standard as prescribed by Simmons Foods, Inc. (Siloam Springs, Ariz. 72761). To foster granulation, collected litter was ground until it passed through a 5.8 mm screen and thoroughly mixed using a New Holland 352 feed mill mixer (CNH Global N.V., Lake Forest, Ill. 60045).

BS were obtained from Stuttgart Municipal Water Works in Stuttgart, Ark. which were dried using a SludgeMASTER RK Indirect Sludge Dryer (Fen-Tech Environmental Inc., Brownwood, Tex. 76801) after aerobic wastewater digest. During wastewater treatment, metal salts and polymers were added to reduce overall P solubility and to assist in solids flocculation. BS were heated in temperature increments for approximately three (3) hours. Initially, BS were heated to approximately 343° C. and then the temperature was lowered to approximately 227° C. as BS moved through the dryer. Dried BS were ground to pass a 1.0 mm screen (Pulva Corporation, Saxonburg, Pa. 16056).

PL, BS, feed-grade urea (46% N) (Mosaic Co., Plymouth, Minn. 55441), and DCD (Agrotain Int., LLC, Collierville, Tenn. 38017) were weighed in appropriate ratios (FIG. 2) to give a final granulated organic fertilizer mean analysis of 152 g N, 15 g P, 19 g K, and 303 g C. As illustrated in FIG. 1, dry ingredients were blended together in a rotary cement mixer for approximately thirty (30) minutes prior to granulation. The PL, BS and additives mixture was fed into a bench scale, pin mixer granulator (8D32L Pin Mixer, Mars Mineral, Mars, Pa. 16046) running at approximately 1400 rotations per minute (rpm) using a vibrating screw feeder (1015 Series Volumetric Screw Feeder, Acrison Inc., Moonachie, N.J. 07074) at a rate of approximately 2.09 kg mixed dry product $min^{-1}$. Binding agents were added through a 6502 nozzle (Spraying Systems Co., Wheaton, Ill. 60189) set at approximately 0.276 MPa. Binding agents were tap water, lignosulfonate (Norlig G-58%, LignoTech USA, Inc., Bridgewater, N.J. 08807), and/or urea formaldehyde (Resin 730D98, Georgia-Pacific Resins, Inc., Decatur, Ga. 30035). Urea formaldehyde was mixed on a 1:44 ratio (catalyst:urea formaldehyde resin, w:w basis) with a sulfuric acid and triethylamine catalyst to assist in thermosetting (Catalyst 4590, Georgia-Pacific Resins, Inc., Decatur, Ga. 30035). Granule samples used for evaluation were collected only after representative granules were being produced. After granulation, products were dried at approximately 191° C. for about 3.5 hours until average water concentration was reduced to about 120 g water $kg^{-1}$ (McMullen, et al., 2005).

Granule Physical Characteristics

The granulated organic fertilizers ranged in loose bulk density from approximately 0.44 to approximately 0.59 g $cm^{-3}$ (FIG. 3); which was lower than commercially available urea and triple superphosphate ("TSP") fertilizers (0.76 and 1.09 g $cm^{-3}$, respectively) (FIG. 4). Loose bulk density measurements indicated that granules with formulations containing BS were denser than other formulations in a BS×DCD× binding agent interaction (FIG. 3). In treatments without BS, lignosulfonate and urea formaldehyde produced heavier granules than water bound treatments (FIG. 3). Denser products would allow for more weight to be shipped per volume, reducing shipping cost per kilogram of N or P.

In order to measure stress incurred during storage, transport, and application, an attrition test was used. Attrition measured strength of granules when exposed to friction due to shaking Fines produced due to attrition may cause uneven spreading during application, are susceptible to blowing during windy conditions, and likely mineralize nutrients at different rates than larger particles. The various binding agents interacted with additions of BS and DCD to produce granules with varying levels of deterrence to attrition. Granules without BS or DCD and water bound were the weakest products during the attrition study, as 3.68% fell through a 0.85 mm screen (FIG. 5). Conversely, the same no BS and no DCD treatment had the strongest granules when bound with urea formaldehyde resin (0.34%) (FIG. 5). Water was one of the strongest binding agents when DCD and BS were included in the granule formulation (0.54%).

Crush tests to quantify granular strength were conducted to determine the amount of force required to crush the granule between two metal plates. In a BS×binding agent interaction, averaged over DCD treatments, water bound treatments without BS had the weakest granules as 336 Nw was needed to crush the granule (FIG. 6). All other formulations with different binding agents were statistically similar. However, even the weakest granules required more force to crush than TSP and urea (260 and 238 Nw, respectively) (FIG. 4), indicating the granulated organic fertilizer produced was sufficiently strong in all formulations.

Granule Water Soluble P Release

A BS×binding agent interaction indicated highest percentages of TP present as DRP when no BS were added to formulations, averaged over DCD treatments (FIG. 7). Decreases in DRP as a percentage of TP in BS are attributed to the addition of metal salts during the wastewater treatment process and a long C chain charge neutralization polymer added during dewatering to assist in solids flocculation (ECO130LH, Ecotech Enterprises, Inc., Little Rock, Ariz. 72223). Reduction of the DRP fraction may facilitate reducing DRP losses in rainfall events after fertilizer application. Similarly, additions of lignosulfonate and urea formaldehyde reduced the fraction of DRP present as TP compared to water bound granules (FIG. 7).

Impact of Granulation Process on Granule Inorganic N and P

The granulation process changed concentrations of inorganic N and P fractions that were readily extractable during the water shake study compared to pre-granulation ingredient concentrations. A BS×binding agent interaction, averaged over DCD treatments, showed a loss of $NH_4$—N in all granule formulations (FIG. 8). Urea formaldehyde bound granules had 74% less $NH_4$—N extracted than amounts calculated from dry ingredients prior to granulation in treatments with BS (FIG. 8). Conversely, water bound granules with BS only had a reduction of 28% of calculated $NH_4$—N. Treatments without BS had about half of the calculated $NH_4$—N as water extractable forms regardless of binding agent. Regardless of binding agent or BS treatment, less $NH_4$—N was readily released from granulated PL and BS fertilizers than fresh BS and PL ingredients. Less inorganic N decreases plant availability but also decreases risk of readily algae available forms in runoff, at least in the short-term until mineralization ensues.

DRP had differing reactions when exposed to granulation processes than inorganic N. In a BS×DCD×binding agent interaction, a range of 106% to 278% more DRP was extracted from granules than the maximum concentration available based on dry ingredient concentrations (FIG. 9). Therefore, granular formulations are a source of higher plant available P concentrations compared to fresh PL and BS. Water-bound granules mineralized and released more DRP than other binding agents while urea formaldehyde treatments had similar or less DRP released than lignosulfonate (FIG. 9).

Total N Mineralized from Granules

Figure 10:
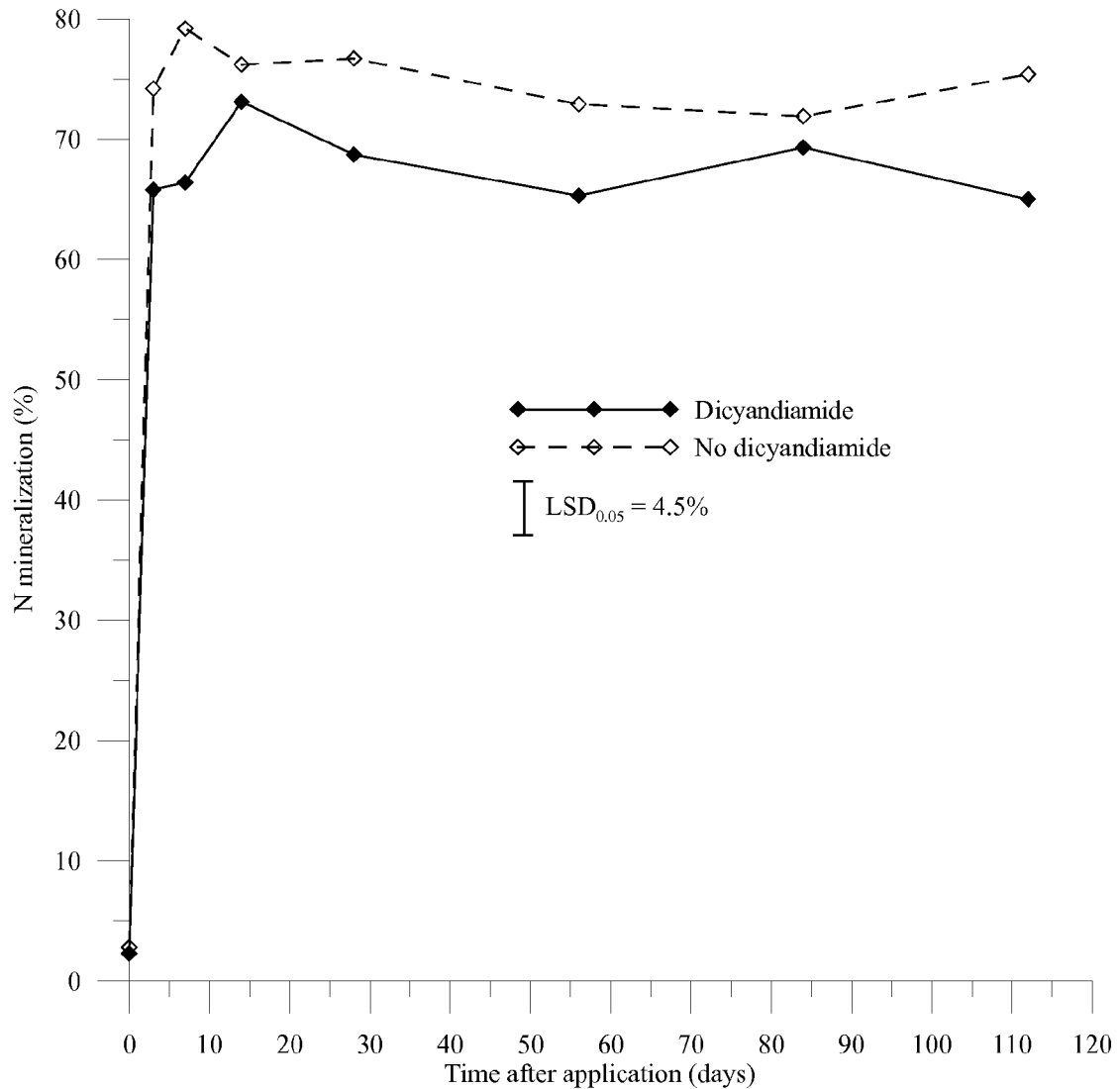
FIG. 10 is a graph illustrating the influence of DCD on N-fortified PL and BS granular fertilizer mineralization for a 112-day incubation study with Dewitt silt loam and averaged over BS and binding agent treatments.
Figure 11:
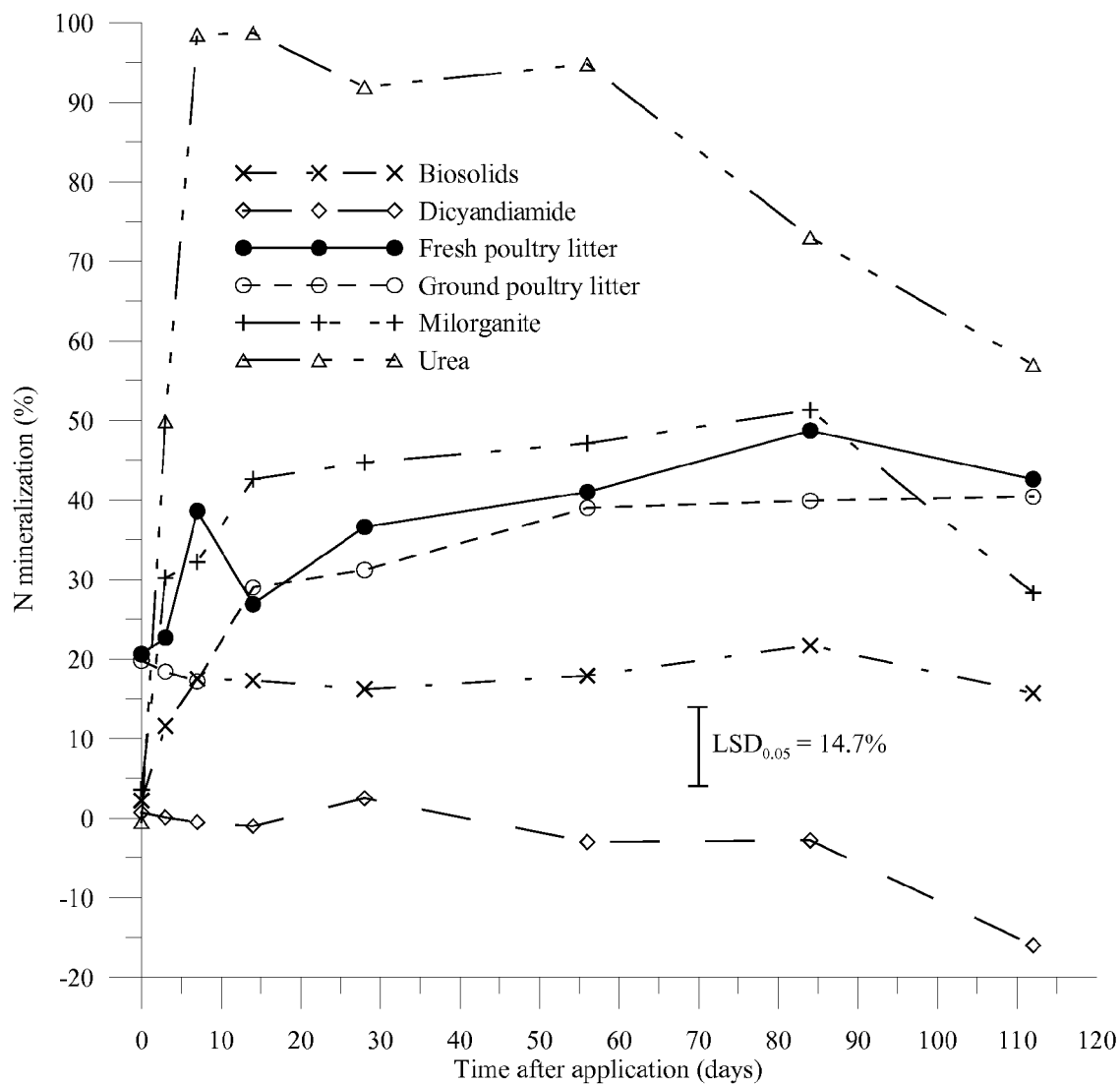
FIG. 11 is a graph illustrating N mineralization from dry ingredients and commercial fertilizers over a 112-day incubation study on Dewitt silt loam.

Granular PL and BS fertilizers had an average of 6.7% less available N when DCD was added to formulations compared to treatments without DCD (FIG. 10). DCD and N began to mineralize after the $56^{th}$ day and had statistically similar N mineralization as treatments without DCD by the $84^{th}$ day (FIG. 10). After the third day, granular PL and BS fertilizers without DCD averaged 75.2% TN availability while formulations with DCD only had 67.7% available N. Nitrogen-fortified PL and BS fertilizers had more available N eighty-four (84) days after application than fresh PL, BS or urea (FIGS. 10 and 11).

Inorganic N Fractions in Soil

Figures 12A, 12B:
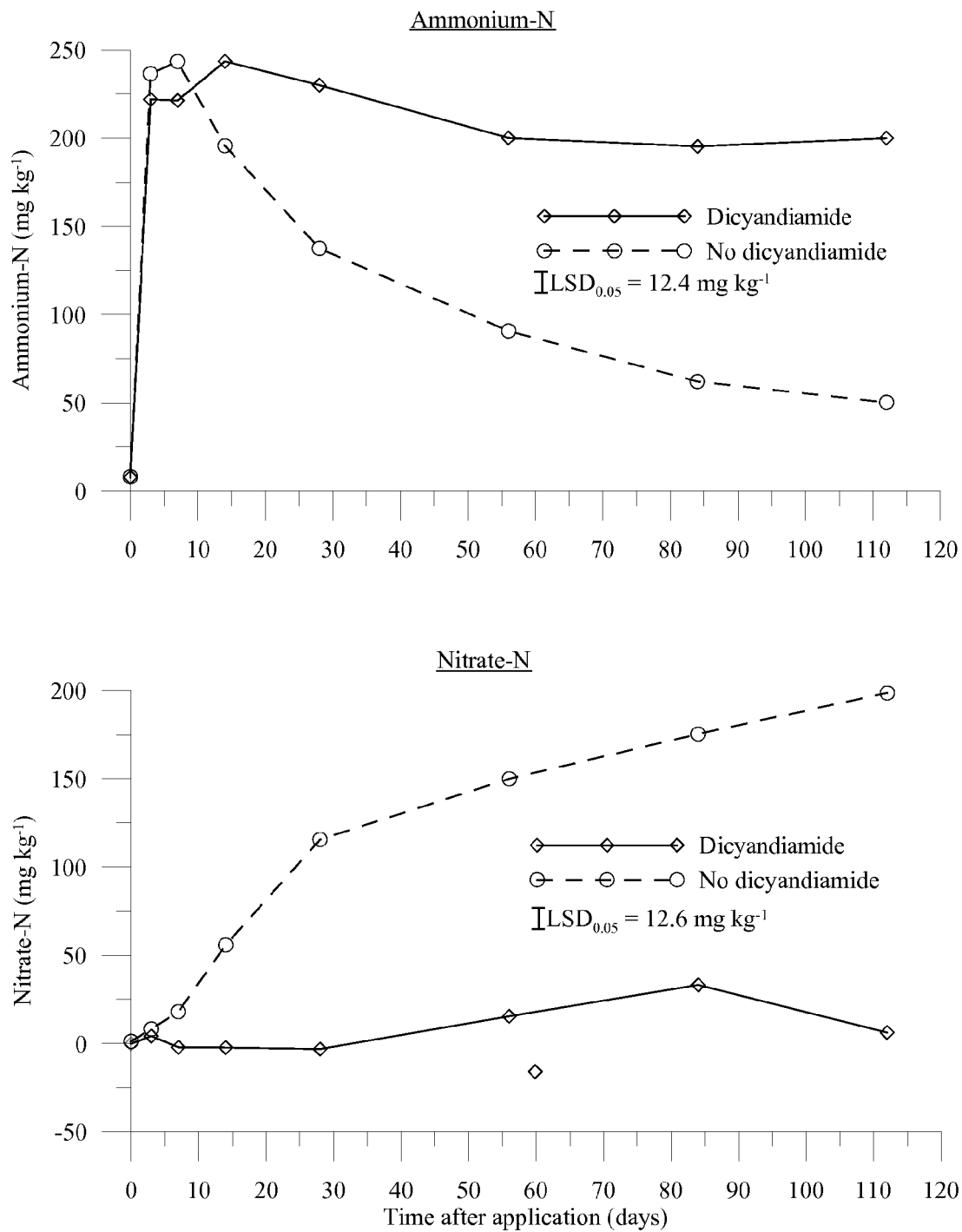
FIGS. 12a and 12b are graphs illustrating ammonium-N and $NO_3$—N mineralization from N-fortified PL and BS granular fertilizers over a 112-day incubation study with Dewitt silt loam and averaged over BS and binding agent treatments.
Figures 13A, 13B:
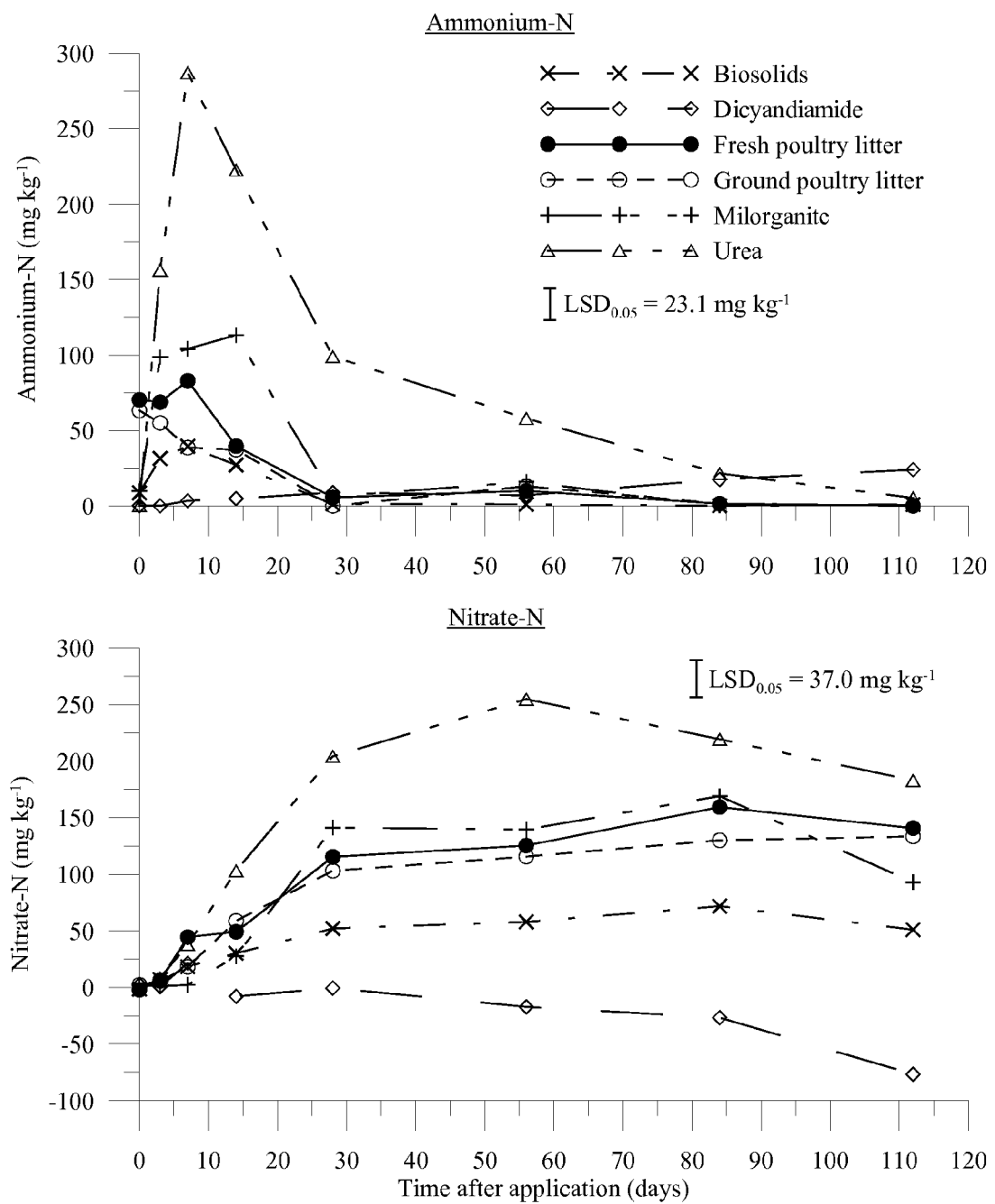
FIGS. 13a and 13b are graphs illustrating ammonium-N and $NO_3$—N mineralization from dry ingredients and commercial fertilizers over a 112-day incubation study with Dewitt silt loam.

DCD additions were significant in a DCD×time interaction for soil inorganic N concentrations (FIG. 12), averaged over BS and binding agent treatments. Treatments without DCD had significant nitrification occurring seven (7) days after fertilizer application and nitrate ($NO_3$—N) concentrations continued to increase thereafter (FIG. 12), mimicking fresh PL and urea treatments (FIG. 13). A concomitant decrease was observed in soil ammonium ($NH_4$—N) concentrations in no DCD treatments as nitrification ensued (FIG. 12). Treatments with DCD did not have appreciable soil $NO_3$—N concentrations until fifty-six (56) days after fertilizer application. Ammonium-N concentrations for DCD treatments peaked fourteen (14) days after fertilizer application (243.5 mg $NH_4$—N $kg^{-1}$) and began to decline thereafter (FIG. 12), likely from immobilization and nitrification.

Example 1

Materials and Methods

Research plots were established in 2004-2006 at the Rice Research and Extension Center near Stuttgart, Ariz. (34° 27'N; 91° 33'W) to test flood-irrigated rice response to N fertilizers developed from PL. Plots were situated on a Dewitt silt loam (fine, smectitic, thermic Typic Albaqualfs) previously cropped with soybean (*Glycine max* (L.) Merr). Fertilizer treatments were fresh PL, PLU, PLUDCD, and urea. Fresh PL, PLU and PLUDCD treatments were applied to dry soil and incorporated using a rotary tiller (FIG. 14). "Wells" rice was immediately planted after fertilizer incorporation at 100 lb seed/acre. In 2004, preflood urea treatments were applied to wet soil at the 5-leaf growth stage and a permanent 10-cm flood was established within 3 days (FIG. 14). In 2005 and 2006, preflood urea treatments were applied to dry soil and permanent flood was established within 24 hours (FIG. 14). All N sources were applied on a TN basis at 60, 100, 140, and 180 lb N/acre, and a no-N control was also included. The aboveground portion of rice was collected from 3 feet of row at early heading to determine TN uptake. Grain yield was determined by harvesting the middle 7 rows from each plot. Grain yields were adjusted to 13.5% moisture prior to statistical analysis.

Figures 15A, 15B, 15C:
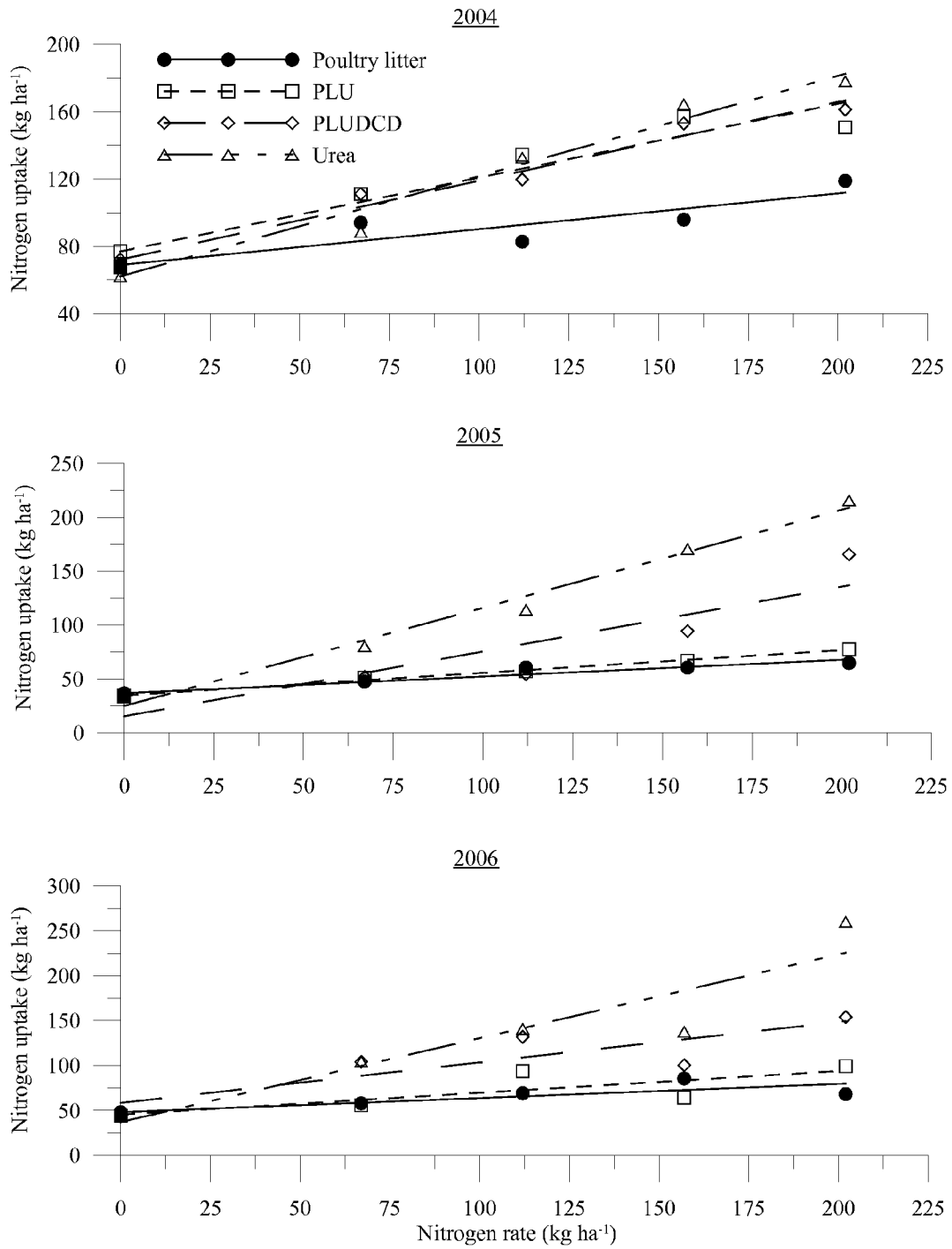
FIGS. 15a, 15b and 15c are graphs illustrating rice plant N uptake for fresh PL, granular PL fortified with urea ("PLU"), PLU fortified with a nitrification inhibitor ("PLUDCD"), and preflood applied urea for 2004, 2005, and 2006 on a Dewitt silt loam.
Figures 17A, 17B, 17C:
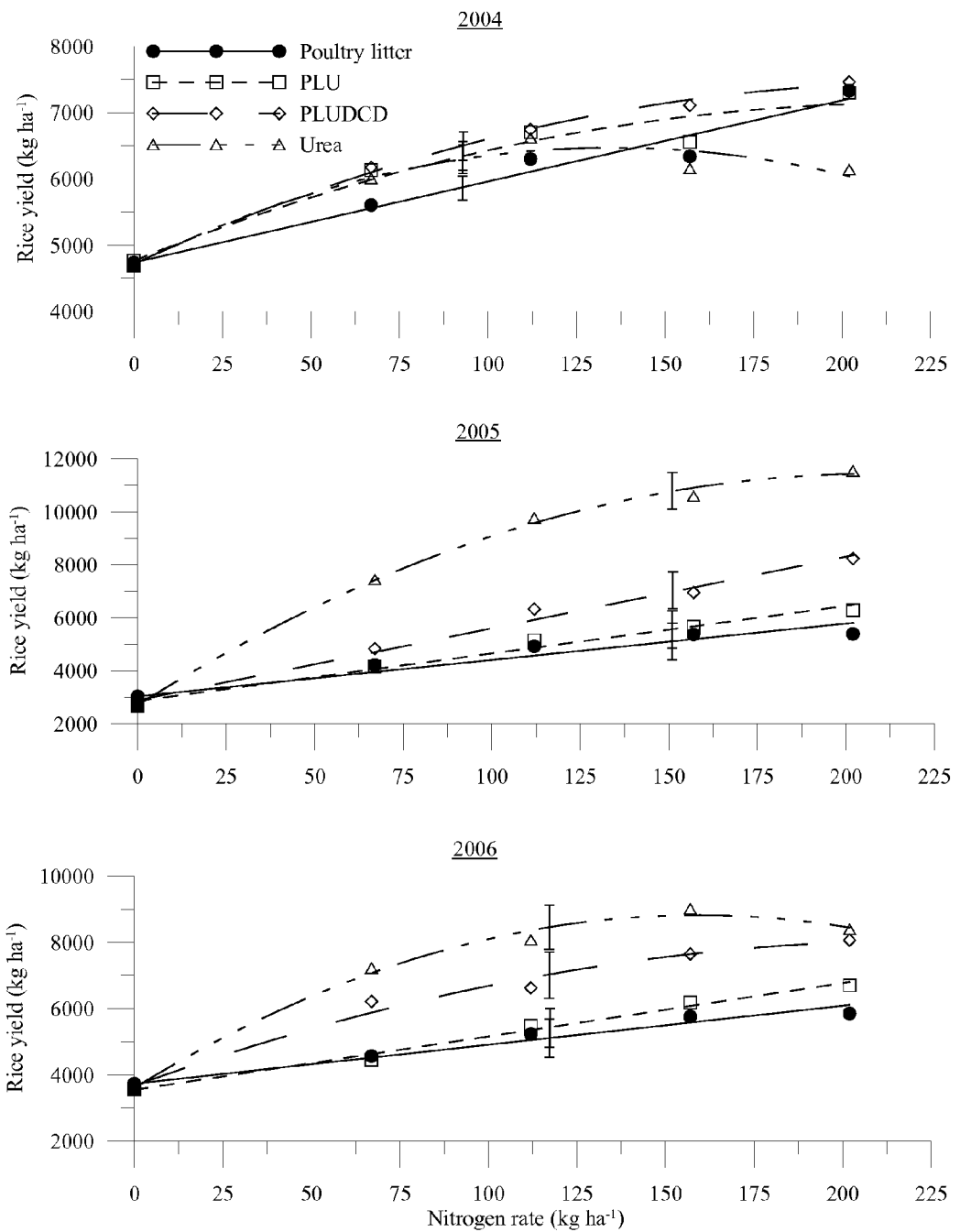
FIGS. 17a, 17b and 17c are graphs illustrating rice grain yield responses when fertilized with fresh PL, granular PLU, PLU fortified with a nitrification inhibitor (PLUDCD), and preflood applied urea for 2004, 2005, and 2006 on a Dewitt silt loam.

The experiment was arranged in a factorial arrangement of four (4) N sources×five (5) N rates using a randomized complete block design with four (4) replications. Rice grain yield and total aboveground N uptake were analyzed using simple linear and non-linear regression procedures using SAS v. 9.1. Regression equations for the highest order (quadratic or linear) significant model were used. For rice yields, confidence intervals were used to compare linear to non-linear relationships at the lowest N rate that provided maximum yields for preflood urea treatments, as illustrated in FIGS. 17*a, b* and *c*. For N recovery, linear slopes were used to estimate plant N uptake per lb N applied, as illustrated in FIGS. 15*a, b* and *c*. An alpha level of 0.10 was used for all statistical analysis and was chosen a priori.

Results

Rice Plant Nitrogen Uptake

Rice plant N uptake varied by year and each year is presented separately. Rice plant N uptake reacted in a linear response to all N sources in all years and N sources were compared according to their N fertilizer recovery efficiency ("FRE") measured by slope from N uptake response models (FIGS. 15*a, b* and *c*).

In 2004, preflood urea treatments were applied to a moist soil which led to the lowest plant N uptake for urea among years (58% N (FRE), FIGS. 15*a* and 16). As illustrated in FIG. 16, the PLU and PLUDCD granular fertilizers had numerically lower, but statistically similar N FRE as preflood applied urea (46 and 48% vs. 58%, respectively). Poultry litter had the lowest N FRE (22%) out of all N sources.

Rice receiving preflood urea treatments in 2005 had 79% N FRE which was greatest among N sources (FIGS. 15*b* and 16). As illustrated in FIG. 16, DCD successfully increased rice N uptake in PLUDCD treatments compared to PLU (56% vs. 21%, respectively), but N FRE was still not as great as preflood urea, with reduced N loss from denitrification being the likely cause for this effect. Although rice can assimilate both inorganic N species ($NH_4$—N and $NO_3$—N), rice plant N assimilation does not peak until twenty-one (21) days after flooding and significant denitrification would have already occurred in non-DCD treatments. Granulated PLU and fresh PL treatments had the lowest N FRE with only 16 and 21% of TN applied being assimilated by plants, respectively (FIG. 16).

Rice plant N uptake in 2006 generally showed similar trends as reported for 2005 (FIGS. 15*c* and 16). Preflood urea had the highest N FRE with 98% of applied N being assimilated by plants (FIG. 16). Dicyandiamide addition increased N FRE from 25% for PLU to 49% for PLUDCD. Fresh PL and PLU had the lowest FRE efficiency out of all N sources (17% and 25%, respectively).

Rice Grain Yield

Due to a mix of linear and non-linear yield responses, all N source models were compared at the lowest preflood urea N rate (FIGS. 17*a, b* and *c*) that gave similar yields as the peak N rate. In 2004, preflood urea applications of 90 kg N $ha^{-1}$ gave similar yields as the N source model's peak of 135 kg N $ha^{-1}$ and was used for comparison to other sources (FIGS. 17*a* and 18). Rice yielded 6272 kg $ha^{-1}$ with 90 kg N $ha^{-1}$ N rate applications resulting in an N agronomic efficiency of 17.5 kg rice produced per kg N applied. The PLU and PLUDCD granules (17.5 and 19.5 kg rice kg $N^{-1}$, respectively) had statistically similar N agronomic efficiency as preflood applied urea (17.5 kg rice kg $N^{-1}$). Fresh PL had the lowest N agronomic efficiency (12.4 kg rice kg $N^{-1}$) out of all sources.

Rice grain yields in 2005 were compared at preflood urea applications of 152 kg N ha$^d$ (FIGS. 17b and 18). Granular PLUDCD had higher yields than fresh PL and PLU granules; which were similar and produced 14.7 kg and 18.4 kg rice kg N$^{-1}$. Similar trends between rice grain yield, N rate and N source were observed in 2006 as described for 2005 (FIGS. 17c and 18).

Data from 2004 should generally be disregarded do to abnormally wet conditions prior to permanent rice flooding. Both plant N uptake and rice yield indicated that N efficiency generally increased in the following manner: fresh PL≦PLU<PLUDCD<preflood urea. Averaged across years, plant recovery of PL, PLU, PLUDCD, and preflood urea averaged 17, 23, 53, and 89% of applied TN and produced 14, 17, 29, and 47 kg rice kg N$^{-1}$ applied, respectively.

Example 2

Materials and Methods

Research plots were established in 2004-2005 at the Lon Mann Cotton Research Station in Marianna, Ariz. (34° 46'N; 90° 45'W) to test upland seed cotton yield to N fertilizers developed from PL (FIG. 19). Plots were located on a Loring silt loam (Fine-silty, mixed, active, thermic Oxyaquic Fragiudalfs) cropped in sod prior to 2004 and cotton prior to 2005. Fertilizer treatments were fresh PL, PLU, PLUDCD, urea applied at-planting, and urea 50-50 split applied between at-planting and first match head square formation (FIG. 20). Fresh PL, PLU and PLUDCD treatments were applied to dry soil and incorporated. 'Stoneville 4892BR' cotton was immediately planted after fertilizer incorporation at 89,000 plants ha$^d$. All N sources were applied on a TN basis at 34, 67, 101, 134, and 168 kg N ha$^{-1}$, and a 0-N control was also included. Seed cotton yield was determined by harvesting the middle two (2) rows from each four (4) row plot.

The experiment was arranged in a factorial arrangement of five (5) N sources×five (5) N rates using a randomized complete block design with four (4) replications. Seed cotton yield was analyzed using simple linear and non-linear regression procedures using SAS v. 9.1. Regression equations for the highest order (quadratic or linear) significant model were used. For seed cotton yields, confidence intervals were used to compare relationships at 90% peak yield for the 50-50 split urea treatment. Nitrogen agronomic efficiency (kg seed cotton produced per kg N applied) was found by subtracting the y-intercept (0-N application) from the 90% highest predicted yield value and dividing by the N rate that provided 90% maximum yield for the 50-50 split urea treatment.

Results

Seed cotton yield data was significant by year. Generally, N efficiency was two (2) to four (4) times higher in 2005 than 2004 (FIG. 21). In 2004, seed cotton yield varied in a year×N source×N rate interaction (FIG. 21). A N rate of 91 kg N ha$^{-1}$ provided 90% maximum yield for split urea treatments and is the point where N sources were compared. Fresh PL and PLU N sources had no significant relationship, and therefore, means of 3372 and 3249 kg seed cotton ha$^{-1}$ were presented and were similar according to their confidence intervals (FIG. 21). Urea applied at-planting, urea applied in a split application and PLUDCD all had similar seed cotton yields and agronomic efficiencies (4.9 to 7.6 kg seed cotton kg N applied$^{-1}$). No yield advantage was seen by splitting urea applications compared to one at-planting application.

Quadratic regression responses were observed for all N fertilizer sources in 2005 and were compared at the 90% peak yield N rate for split urea treatments of 70 kg N ha$^{-1}$ (FIG. 21). Split urea, urea applied at-planting, PLU, and PLUDCD all had similar predicted seed cotton yields and N agronomic efficiencies that ranged from 16.8 to 19.5 kg seed cotton produced per kg N applied. Applying all N at-planting may be suitable in Arkansas cotton production systems since these treatments gave similar yields and agronomic efficiencies as split N treatments. Seed cotton yield data indicated that N efficiency generally increased in the following manner: fresh PL≦PLU≦PLUDCD=urea applied at-planting=urea applied in a 50-50 split application between at-planting and first match head square formation. Using N-fortified PL fertilizers is a viable option since all fertilizer material can be applied at-planting and incorporated without any decrease in agronomic efficiency and yield. N fortification was necessary to provide sufficient N to the cotton plant during the growing season.

Example 3

Materials and Methods

Research was conducted on a Captina silt loam (Fine-silty, siliceous, active, mesic Typic Fragiudult), had 4% slope, and was seeded with bermudagrass (*Cynodon dactylon*) manicured as a golf course fairway. Background soil characteristics taken before rainfall simulations are listed in FIG. 22. Soil concentrations were multiplied by 1,831,100 lbs soil/acre furrow slice (four (4) inch depth) to achieve nutrient concentrations per acre. For fertilizer and soil, inorganic N and DRP were extracted on a 1:10 ratio of 2 M KCl and deionized water, respectively. TN was found by dry combustion and organic N determined by subtracting inorganic N from TN. Total P was quantified by a concentrated $HNO_3$ and $H_2O_2$ digest. Nitrogen-fortified PL and BS granular fertilizers, BS, Milorganite, fresh PL, and urea+TSP treatments were applied on a TP basis at a rate of 18 lbs P/acre. The rates of inorganic N, organic N, TN, DRP, and total solids applied are presented in FIG. 22. All fertilizer applications were applied on the morning of rainfall simulations.

Rainfall simulation plots were established according to the National Phosphorus Project Protocol (http://www.sera17.ext.vt.edu/Documents/National_P_protocol.pdf) using a portable rainfall simulator during Aug. 10-12, 2006. Rainfall was simulated at an intensity of 2.6 inches/hour and a composite runoff sample was collected for thirty (30) minutes from the beginning of the runoff event. A non-acidified runoff sub-sample was filtered through 0.45 µm pore filter paper for DRP analysis. An unfiltered sub-sample was acidified and quantified for inorganic N and TN. The remaining unfiltered and non-acidified sample was digested and analyzed for TP.

Rainfall simulations were established as a randomized complete block design with three (3) replications. Initially, just the twelve (12) N-fortified PL and BS fertilizers, FIG. 2, were analyzed in a two (2)×two (2)×three (3) factorial arrangement of fertilizers with and without BS, with and without DCD, and bound with one of three binding agents (lignosulfonate, urea formaldehyde or water) totaling the twelve (12) different fertilizer permutations. Secondly, the twelve (12) N-fortified PL and BS fertilizers, fresh PL, dried municipal BS, Milorganite, urea+TSP, and a no-fertilizer control were compared. Data were analyzed using analysis of variance (PROC GLM) with SAS software. Means were separated using Fisher's protected least significant difference tests (LSD) using a significance level of $p \leq 0.10$ that was established a priori.

Results

Comparison Amongst PL and BS Formulations

Additions of BS to formulations generally decreased TP loss, runoff load and runoff concentrations by 50% (FIG. 23), with the exception of water bound treatments. Metal salt additions to BS during the waste water treatment process reduced granule DRP concentrations by 50% (formulations were 50% BS and 50% PL, FIG. 22) and was responsible for reducing overall TP loss. Binding agents had little influence on TP or DRP loss. It was expected lower runoff nutrient concentrations in formulations bound with urea formaldehyde or lignosulfonate since granulation produced physically stronger granules with these binding agents (data not shown); however, all granules were generally equal in water solubility during rainfall simulations regardless of binding agent and no strong treatment effect was observed (FIG. 23).

Granular fertilizer formulations containing DCD had more TN lost in runoff than treatments without DCD (4.9% vs. 3.6% TN lost, respectively). DCD is water soluble and was carried in runoff as granules dissolved during the rainfall simulation. However, DCD may still reduce overall N loss by inhibition of nitrification that leads to denitrification and leaching of nitrates. Similar to DRP and TP findings, no strong trend was shown regarding various binding agents with TN loss (data not shown).

Phosphorus in Runoff Water

TP runoff water concentrations, loads and percentage TP applied lost were significantly affected by fertilizer sources (FIG. 23). The urea+TSP treatment had higher runoff water concentrations, loads and percentages of TP applied lost (28.8 mg P $L^{-1}$, 4.9 kg P $ha^{-1}$ and 24.7% TP loss, respectively) than any N-fortified PL and BS granulated organic fertilizer treatment (FIG. 23). TP lost as a percentage of TP applied ranged from 3.8% to 16.9% and followed trends similar to TP load and TP runoff water concentration (FIG. 24). With the exception of water-bound treatments, BS additions generally decreased TP loss, runoff water load and runoff water concentrations by 50% from 13.8% to 6.0%, 2.8 to 1.2 kg P $ha^{-1}$ and 12.4 to 6.3 mg $L^{-1}$ (FIG. 24). Reducing TP loss is one of the most important aspects in reducing accelerated eutrophication in P-deficient waterways.

DRP runoff water concentrations were higher from inorganic TSP (4.2 mg DRP $L^{-1}$) applications than any other fertilizer treatment used herein (FIG. 23). N-fortified PL and BS fertilizer DRP runoff concentrations were similar too or less than fresh PL (3.0 mg $L^{-1}$) even though granule DRP concentrations were up to 278% higher (FIG. 23). Allowing higher DRP fertilizer applications with similar or less loss than fresh PL equates to greater plant availability with less nutrient loss.

Comparison to Inorganic and Organic Fertilizers

Fertilizer treatments were applied on a P basis, and therefore, N data is only discussed as a percentage since different amounts were applied to plots (FIG. 22). TN lost as a percentage of TN applied ranged from 0.0 (no-fertilizer added) to 7.6% (PLUBDCD-W) (FIG. 25). Granulated PL and BS fertilizers generally had similar TN losses as urea (3.9%) and Milorganite (3.2%). Generally, PL, Milorganite, urea, and N-fortified PL and BS granule treatments had similar proportions of $NH_4$—N, $NO_3$—N and organic N represented as TN load (FIG. 25). Most N was present as $NH_4$—N and organic N while $NO_3$—N concentrations were generally an inconsequential factor in this experiment.

Nitrogen in Runoff Water

Granules with BS had less $NH_4$—N and more organic N than treatments without BS. Treatments with BS may pose a delayed risk to waterways as less N was readily algae available.

Solids in Runoff Water

Formulations without BS (13.6%) had higher total solid losses than formulations with BS (9.5%) in a BS main effect (FIG. 26). BS additions to formulations decreased total solid losses and potentially results in lower chemical oxygen demands and nutrient inputs when runoff water enters waterways. Formulations without BS (82.3%) also had higher total fractions present as dissolved solids compared to BS treatments (66.7%) (FIG. 26). Lower dissolved solid fractions are desirable as dissolved solids are quickly decomposed and nutrients released in waterways.

In sum, using tap water compared to more expensive lignosulfonate and urea formaldehyde binders generally worked equally well in retarding N and P loss in runoff water. Additions of DCD to formulations may increase N loss while BS additions retard P loss. Processing PL (grinding and heating) did not generally accentuate runoff nutrient concentrations over fresh PL.

Whereas, the compositions and processes have been described in relation to the figures of the drawings and claims, it should be understood that other and further modifications, apart from those shown or suggested herein, may be made within the spirit and scope of this invention.

What is claimed is:

1. A process of producing a granulated organic fertilizer, said process comprising the steps of:
    a. forming a dry mixture of:
        i. approximately 44% to approximately 46% by weight poultry litter;
        ii. approximately 20% to approximately 25% by weight urea;
        iii. approximately 31% to approximately 32% by weight biosolids; and
        iv. approximately 2.3% by weight dicyandiamide;
    b. granulating said dry mixture in a pin mixer to form a granulated dry mixture;
    c. adding a binding agent to said granulated dry mixture to form a bound-granulated product; and
    d. drying said bound-granulated product to form said granulated organic fertilizer.

2. The process of claim 1 further comprising the steps of:
    a. grinding said poultry litter;
    b. passing said ground poultry litter through an approximately 5.8 mm screen; and
    c. mixing said ground poultry litter in a feed mill mixer.

3. The process of claim 1 further comprising the step of drying said biosolids.

4. The process of claim 3 wherein said step of drying said biosolids further comprises the steps of:
    a. heating said biosolids in temperature increments for approximately three hours;
    b. grinding said dried biosolids; and
    c. passing said dried, ground biosolids through an approximately 1.0 mm screen.

5. The process of claim 4 wherein said step of heating said biosolids further comprises the steps of heating said biosolids to a temperature of approximately 343° C., and subsequently lowering said temperature to approximately 227° C.

6. The process of claim 1 wherein said step of forming said dry mixture further comprises the step of mixing said dry mixture in a rotary mixer for approximately thirty minutes.

7. The process of claim 1 wherein said step of forming said dry mixture further comprises the step of forming said dry mixture of:
   a. approximately 45.6% by weight poultry litter;
   b. approximately 20.4% by weight urea;
   c. approximately 31.8% by weight biosolids; and
   d. approximately 2.3% by weight dicyandiamide.

8. The process of claim 1 wherein said step of granulating said dry mixture further comprises the step of feeding said dry mixture into said pin mixer running at approximately 1400 rotations per minute using a vibrating screw feeder at a rate of approximately 2.09 kg dry mixture per minute.

9. The process of claim 1 wherein said step of adding said binding agent further comprises the step of forming a liquid binding agent mixture of:
   a. approximately 69% to approximately 100% by weight water;
   b. approximately 0% to approximately 31% by weight lignosulfonate; and
   c. approximately 0% to approximately 31% by weight urea formaldehyde.

10. The process of claim 9 wherein said step of forming said liquid binding agent mixture further comprises the step of forming said liquid binding agent mixture of approximately 69% by weight water and approximately 31% by weight lignosulfonate or approximately 31% by weight urea formaldehyde.

11. The process of claim 9 further comprising the step of applying said liquid binding agent mixture to said granulated dry mixture via a spray nozzle set at approximately 0.276 MPa to form said bound-granulated product.

12. The process of claim 9 further comprising the step of mixing said urea formaldehyde with a catalyst.

13. The process of claim 12 further comprising the step of mixing said urea formaldehyde with a sulfuric acid and triethylamine catalyst on a 1:44 weight-to-weight ratio.

14. The process of claim 1 wherein said step of drying said bound-granulated product further comprises the step of drying said bound-granulated product at approximately 191° C. until the average water concentration of said granulated organic fertilizer is approximately 120 g of water per kilogram of said granulated organic fertilizer.

15. The process of claim 1 wherein said step of drying said bound-granulated product further comprises the step of drying said bound-granulated product at approximately 191° C. for approximately 3.5 hours.

16. A value-added-granulated organic fertilizer, comprising:
   a. approximately 44% to approximately 46% by weight poultry litter;
   b. approximately 20% to approximately 25% by weight urea;
   c. approximately 31% to approximately 32% by weight biosolids;
   d. approximately 0% to approximately 2.3% by weight of dicyandiamide; and
   e. a binding agent;
   wherein said weight percentages are based on the weight sum of components (a) said poultry litter, (b) said urea, (c) said biosolids and (d) said dicyandiamide.

17. The granulated organic fertilizer of claim 16 comprising:
   a. approximately 45.6% by weight of said poultry litter;
   b. approximately 20.4% by weight of said urea;
   c. approximately 31.8% by weight of said biosolids;
   d. approximately 2.3% by weight of said dicyandiamide; and
   e. said binding agent.

18. The granulated organic fertilizer of claim 16 comprising:
   a. approximately 44.8% by weight of said poultry litter;
   b. approximately 24.0% by weight of said urea;
   c. approximately 31.2% by weight of said biosolids; and
   d. said binding agent.

19. The granulated organic fertilizer of claim 16 wherein said binding agent comprises:
   a. approximately 69% to approximately 100% by weight water;
   b. approximately 0% to approximately 31% by weight lignosulfonate; and
   c. approximately 0% to approximately 31% by weight urea formaldehyde.

20. The granulated organic fertilizer of claim 19 wherein said binding agent comprises approximately 69% by weight water and approximately 31% by weight lignosulfonate or approximately 31% by weight urea formaldehyde.

21. The granulated organic fertilizer of claim 19 wherein said urea formaldehyde includes a catalyst.

22. The granulated organic fertilizer of claim 21 wherein said catalyst is a sulfuric acid and triethylamine catalyst mixed with said urea formaldehyde on a 1:44 weight-to-weight ratio.

23. The granulated organic fertilizer of claim 16 further comprising at least one plant nutrient constituent.

24. The granulated organic fertilizer of claim 16 wherein said granulated organic fertilizer has a loose bulk density of approximately 0.44 g/cm$^3$ to approximately 0.59 g/cm$^3$ and a packed bulk density of approximately 0.45 g/cm$^3$ to approximately 0.64 g/cm$^3$.

25. The granulated organic fertilizer of claim 24 wherein said loose bulk density is approximately 0.55 g/cm$^3$ to approximately 0.59 g/cm$^3$ and said packed bulk density is approximately 0.60 µg/cm$^3$ to approximately 0.64 g/cm$^3$.

26. An agglomerated fertilizer, comprising:
   a. a granulated constituent, comprising:
      i. approximately 44% to approximately 46% by weight poultry litter;
      ii. approximately 20% to approximately 25% by weight urea;
      iii. approximately 31% to approximately 32% by weight biosolids; and
      iv. approximately 2.3% by weight dicyandiamide;
   b. a binding agent constituent, comprising:
      i. approximately 69% to approximately 100% by weight water; and
      ii. approximately 0% to approximately 31% by weight lignosulfonate and/or approximately 0% to approximately 31% by weight urea formaldehyde; and
   c. a plant nutrient constituent.

27. A granulated organic fertilizer, comprising:
   a. approximately 44% to approximately 76% by weight poultry litter;
   b. approximately 20% to approximately 25% by weight urea;
   c. up to approximately 32% by weight biosolids;
   d. approximately 2.3% by weight of dicyandiamide; and
   e. a binding agent;
   wherein said weight percentages are based on the weight sum of components (a) said poultry litter, (b) said urea, (c) said biosolids and (d) said dicyandiamide.

28. The granulated organic fertilizer of claim 27 comprising:
   a. approximately 45.6% by weight of said poultry litter;
   b. approximately 20.4% by weight of said urea;
   c. approximately 31.8% by weight of said biosolids;
   d. approximately 2.3% by weight of said dicyandiamide; and
   e. said binding agent.

29. The granulated organic fertilizer of claim 27 comprising:
   a. approximately 75.7% by weight of said poultry litter;
   b. approximately 22.0% by weight of said urea;
   c. approximately 2.3% by weight of said dicyandiamide; and
   d. said binding agent.

30. The granulated organic fertilizer of claim 27 wherein said binding agent comprises:
   a. approximately 69% to approximately 100% by weight water;
   b. approximately 0% to approximately 31% by weight lignosulfonate; and
   c. approximately 0% to approximately 31% by weight urea formaldehyde.

31. The granulated organic fertilizer of claim 30 wherein said urea formaldehyde includes a catalyst.

32. The granulated organic fertilizer of claim 31 wherein said catalyst is a sulfuric acid and triethylamine catalyst mixed with said urea formaldehyde on a 1:44 weight-to-weight ratio.

33. The granulated organic fertilizer of claim 27 further comprising at least one plant nutrient constituent.

34. The granulated organic fertilizer of claim 27 wherein said granulated organic fertilizer has a loose bulk density of approximately 0.44 g/cm$^3$ to approximately 0.59 g/cm$^3$ and a packed bulk density of approximately 0.45 g/cm$^3$ to approximately 0.64 g/cm$^3$.

* * * * *